(12) United States Patent
Farese et al.

(10) Patent No.: US 12,276,436 B2
(45) Date of Patent: Apr. 15, 2025

(54) ULTRA LOW FLOW DESICCANT AIR CONDITIONING SYSTEMS DEVICES AND METHODS

(71) Applicant: Mojave Energy Systems, Inc., Sunnyvale, CA (US)

(72) Inventors: Philip Farese, New Canaan, CT (US); Rachel Ellman, Cupertino, CA (US); Kristopher Toivola, Sunnyvale, CA (US)

(73) Assignee: Mojave Energy Systems, Inc., Sunnyvale, CA (US)

( * ) Notice: Subject to any disclaimer, the term of this patent is extended or adjusted under 35 U.S.C. 154(b) by 0 days.

(21) Appl. No.: 18/646,505

(22) Filed: Apr. 25, 2024

(65) Prior Publication Data

US 2024/0337393 A1 Oct. 10, 2024

Related U.S. Application Data

(63) Continuation of application No. PCT/US2024/023423, filed on Apr. 5, 2024.
(Continued)

(51) Int. Cl.
*B01D 53/02* (2006.01)
*F24F 3/14* (2006.01)

(52) U.S. Cl.
CPC .......... *F24F 3/1429* (2013.01); *F24F 3/1417* (2013.01); *F24F 2003/1458* (2013.01)

(58) Field of Classification Search
CPC . F24F 3/1429; F24F 3/1417; F24F 2003/1458
See application file for complete search history.

(56) References Cited

U.S. PATENT DOCUMENTS

| | | | |
|---|---|---|---|
| 2,147,248 | A | 2/1939 | Fleisher |
| 2,214,880 | A | 9/1940 | Crawford |

(Continued)

FOREIGN PATENT DOCUMENTS

| | | | |
|---|---|---|---|
| CN | 103288252 A | 9/2013 | |
| CN | 105308317 A | 2/2016 | |

(Continued)

OTHER PUBLICATIONS

Abdollahi and Shams, "Optimization of shape and angle of attack of winglet vortex generator in a rectangular channel for heat transfer enhancement," Applied Thermal Engineering, 2015; 81:376-387.

(Continued)

*Primary Examiner* — Christopher P Jones
(74) *Attorney, Agent, or Firm* — COOLEY LLP

(57) ABSTRACT

Systems and methods for conditioning air streams are described herein. In some embodiments, a system can include an absorber and a desorber. The absorber configured to receive a supply air stream including moisture at a first moisture concentration and expose it to a liquid desiccant to remove moisture from the supply air stream and produce a conditioned air stream. The desorber configured to receive a regeneration stream at a first mass flow rate and at least a portion of the liquid desiccant from the absorber and having at least one salt at a first weight percent. The desorber includes an array of emitters configured to direct the portion of the liquid desiccant at a second mass flow rate to a desorber media to facilitate removing moisture from the portion of the liquid desiccant and produce a concentrated liquid desiccant with the at least one salt at a second weight percent.

31 Claims, 9 Drawing Sheets

Related U.S. Application Data

(60) Provisional application No. 63/457,984, filed on Apr. 7, 2023.

(56) References Cited

U.S. PATENT DOCUMENTS

| | | | |
|---|---|---|---|
| 2,276,970 | A | 3/1942 | Hyde |
| 2,290,465 | A | 7/1942 | Crawford |
| 2,672,024 | A | 3/1954 | McGrath |
| 2,798,570 | A | 7/1957 | Kelley |
| 3,277,954 | A | 10/1966 | Gershon |
| 3,336,423 | A | 8/1967 | Le et al. |
| 3,350,892 | A | 11/1967 | Kelley |
| 3,729,142 | A | 4/1973 | Rangel et al. |
| 3,819,118 | A | 6/1974 | Brock et al. |
| 3,981,452 | A | 9/1976 | Eckstein |
| 3,993,248 | A | 11/1976 | Harmony |
| 4,118,299 | A | 10/1978 | Maget |
| 4,164,125 | A | 8/1979 | Griffiths |
| 4,205,529 | A | 6/1980 | Ko |
| 4,259,849 | A | 4/1981 | Griffiths |
| 4,287,721 | A | 9/1981 | Robison |
| 4,340,479 | A | 7/1982 | Pall |
| 4,340,480 | A | 7/1982 | Pall et al. |
| 4,355,683 | A | 10/1982 | Griffiths |
| 4,593,534 | A | 6/1986 | Bloomfield |
| 4,612,019 | A | 9/1986 | Langhorst |
| 4,691,530 | A | 9/1987 | Meckler |
| 4,700,550 | A | 10/1987 | Rhodes |
| 4,900,448 | A | 2/1990 | Bonne et al. |
| 4,905,479 | A * | 3/1990 | Wilkinson .............. F24F 5/00 62/271 |
| 4,955,205 | A * | 9/1990 | Wilkinson ............ F24F 3/1417 95/194 |
| 4,984,434 | A | 1/1991 | Peterson et al. |
| 5,022,241 | A | 6/1991 | Wilkinson |
| 5,058,394 | A | 10/1991 | Wilkinson |
| 5,070,703 | A | 12/1991 | Wilkinson |
| 5,351,497 | A | 10/1994 | Lowenstein |
| 5,460,004 | A | 10/1995 | Tsimerman |
| 5,528,905 | A | 6/1996 | Scarlatti |
| 5,586,727 | A | 12/1996 | Shekalim |
| 5,615,838 | A | 4/1997 | Eckstein et al. |
| 5,634,269 | A | 6/1997 | Lowenstein et al. |
| 5,797,272 | A | 8/1998 | James |
| 5,928,409 | A | 7/1999 | Sirkar |
| 5,966,955 | A | 10/1999 | Maeda |
| 6,018,954 | A | 2/2000 | Assaf |
| 6,080,507 | A | 6/2000 | Yu |
| 6,149,817 | A | 11/2000 | Peterson et al. |
| 6,159,352 | A | 12/2000 | Riera et al. |
| 6,187,201 | B1 | 2/2001 | Abe et al. |
| 6,463,750 | B2 | 10/2002 | Assaf |
| 6,487,872 | B1 | 12/2002 | Forkosh et al. |
| 6,497,107 | B2 | 12/2002 | Maisotsenko et al. |
| 6,497,749 | B2 | 12/2002 | Kesten et al. |
| 6,719,891 | B2 | 4/2004 | Ruhr et al. |
| 6,745,826 | B2 | 6/2004 | Lowenstein et al. |
| 6,976,365 | B2 | 12/2005 | Forkosh et al. |
| 6,986,428 | B2 | 1/2006 | Hester et al. |
| 7,083,730 | B2 | 8/2006 | Davis |
| 7,279,215 | B2 | 10/2007 | Hester et al. |
| 7,430,878 | B2 | 10/2008 | Assaf |
| 7,942,011 | B2 | 5/2011 | Forkosh |
| 7,942,387 | B2 | 5/2011 | Forkosh |
| 7,974,076 | B2 | 7/2011 | Xiong et al. |
| 7,977,395 | B2 | 7/2011 | Lin et al. |
| 7,992,855 | B2 | 8/2011 | Awano |
| 8,142,633 | B2 | 3/2012 | Batchelder et al. |
| 8,171,746 | B2 | 5/2012 | Miyauchi et al. |
| 8,545,692 | B2 | 10/2013 | James et al. |
| 8,623,210 | B2 | 1/2014 | Manabe et al. |
| 8,685,142 | B2 | 4/2014 | Claridge et al. |
| 8,696,805 | B2 | 4/2014 | Chang et al. |
| 8,769,971 | B2 | 7/2014 | Kozubal et al. |
| 8,769,972 | B2 | 7/2014 | Bahar |
| 8,790,454 | B2 | 7/2014 | Lee et al. |
| 8,800,308 | B2 | 8/2014 | Vandermeulen et al. |
| 8,801,910 | B2 | 8/2014 | Bazant et al. |
| 8,999,132 | B2 | 4/2015 | Bazant et al. |
| 9,000,289 | B2 | 4/2015 | Vandermeulen et al. |
| 9,086,223 | B2 | 7/2015 | Vandermeulen et al. |
| 9,101,874 | B2 | 8/2015 | Vandermeulen |
| 9,101,875 | B2 | 8/2015 | Vandermeulen et al. |
| 9,112,217 | B2 | 8/2015 | Kim et al. |
| 9,140,471 | B2 | 9/2015 | Kozubal et al. |
| 9,243,810 | B2 | 1/2016 | Vandermeulen et al. |
| 9,273,876 | B2 | 3/2016 | Smith et al. |
| 9,308,490 | B2 | 4/2016 | Vandermeulen et al. |
| 9,340,436 | B2 | 5/2016 | Sahu et al. |
| 9,506,697 | B2 | 11/2016 | Vandermeulen |
| 9,541,302 | B2 | 1/2017 | Taylor et al. |
| 9,546,426 | B2 | 1/2017 | Logan et al. |
| 9,548,620 | B2 | 1/2017 | Hu et al. |
| 9,631,824 | B1 * | 4/2017 | Maisey .................. F24F 3/147 |
| 9,631,848 | B2 | 4/2017 | Vandermeulen et al. |
| 9,640,826 | B2 | 5/2017 | Yan et al. |
| 9,670,077 | B2 | 6/2017 | Volkel et al. |
| 9,673,472 | B2 | 6/2017 | Volkel et al. |
| 9,709,285 | B2 | 7/2017 | Vandermeulen |
| 9,835,340 | B2 | 12/2017 | Vandermeulen et al. |
| 9,905,876 | B2 | 2/2018 | Schubert et al. |
| 9,982,901 | B2 | 5/2018 | Mongar |
| 10,012,401 | B2 | 7/2018 | Forkosh |
| 10,024,558 | B2 | 7/2018 | Vandermeulen |
| 10,124,296 | B2 | 11/2018 | Pozzo et al. |
| 10,302,317 | B2 | 5/2019 | Erb et al. |
| 10,443,868 | B2 | 10/2019 | Vandermeulen et al. |
| 10,525,417 | B2 | 1/2020 | Newbloom et al. |
| 10,550,014 | B2 | 2/2020 | Desai et al. |
| 10,604,426 | B2 | 3/2020 | Connor, Jr. et al. |
| 10,648,743 | B2 | 5/2020 | Kozubal et al. |
| 10,655,870 | B2 | 5/2020 | Lowenstein |
| 10,712,024 | B2 | 7/2020 | LePoudre et al. |
| 10,721,024 | B2 | 7/2020 | Seo |
| 10,821,395 | B2 | 11/2020 | Beh et al. |
| 10,822,254 | B2 | 11/2020 | Desai et al. |
| 10,962,252 | B2 | 3/2021 | LePoudre et al. |
| 11,015,875 | B2 | 5/2021 | Benedict et al. |
| 11,020,713 | B2 | 6/2021 | Demeter et al. |
| 11,029,045 | B2 | 6/2021 | Woods et al. |
| 11,117,090 | B2 | 9/2021 | Benedict et al. |
| 11,149,970 | B2 | 10/2021 | Bahar et al. |
| 11,185,823 | B2 | 11/2021 | Beh et al. |
| 11,326,790 | B2 | 5/2022 | Woods et al. |
| 11,532,831 | B1 | 12/2022 | Beh |
| 11,760,631 | B2 | 9/2023 | Chandran et al. |
| 11,944,934 | B2 | 4/2024 | Benedict et al. |
| 11,998,871 | B2 | 6/2024 | Benedict et al. |
| 12,050,022 | B2 | 7/2024 | Ellman et al. |
| 2002/0038552 | A1 | 4/2002 | Maisotsenko et al. |
| 2003/0121271 | A1 | 7/2003 | Dinnage et al. |
| 2004/0118125 | A1 | 6/2004 | Potnis et al. |
| 2004/0168462 | A1 | 9/2004 | Assaf |
| 2004/0231512 | A1 * | 11/2004 | Slayzak ............... B01D 53/263 96/290 |
| 2005/0183956 | A1 | 8/2005 | Katefidis |
| 2006/0130654 | A1 | 6/2006 | King et al. |
| 2006/0141346 | A1 | 6/2006 | Gordon et al. |
| 2009/0114594 | A1 | 5/2009 | Sirkar |
| 2009/0178436 | A1 | 7/2009 | Chiriac |
| 2010/0090356 | A1 * | 4/2010 | Sines .................... B01D 53/28 261/29 |
| 2010/0170776 | A1 | 7/2010 | Ehrenberg et al. |
| 2010/0275629 | A1 | 11/2010 | Erickson |
| 2011/0132027 | A1 | 6/2011 | Gommed et al. |
| 2012/0125020 | A1 * | 5/2012 | Vandermeulen .... H01L 31/0521 62/235.1 |
| 2012/0304862 | A1 | 12/2012 | Taylor et al. |
| 2013/0056177 | A1 | 3/2013 | Coutu et al. |
| 2013/0118478 | A1 * | 5/2013 | Armstrong ............. F24S 10/40 126/646 |
| 2013/0199220 | A1 | 8/2013 | Ma et al. |
| 2013/0319021 | A1 | 12/2013 | Ball et al. |

(56) References Cited

U.S. PATENT DOCUMENTS

| | | |
|---|---|---|
| 2013/0340449 A1 | 12/2013 | Kozubal et al. |
| 2014/0054013 A1 | 2/2014 | LePoudre et al. |
| 2014/0260367 A1 | 9/2014 | Coutu et al. |
| 2014/0262125 A1 | 9/2014 | Erb et al. |
| 2014/0326433 A1 | 11/2014 | Kozubal |
| 2014/0349279 A1 | 11/2014 | Berthelot et al. |
| 2015/0048777 A1 | 2/2015 | Goldstein |
| 2015/0059576 A1 | 3/2015 | Shibata |
| 2015/0068225 A1 | 3/2015 | Laughman et al. |
| 2015/0101625 A1 | 4/2015 | Newton et al. |
| 2015/0232348 A1 | 8/2015 | Jepson |
| 2015/0260420 A1 | 9/2015 | Forkosh |
| 2015/0291452 A1 | 10/2015 | Jikihara et al. |
| 2015/0292754 A1 | 10/2015 | Mongar |
| 2015/0300754 A1 | 10/2015 | Vandermeulen et al. |
| 2015/0327596 A1 | 11/2015 | Alarcon et al. |
| 2016/0138817 A1 | 5/2016 | Hamlin et al. |
| 2017/0145803 A1 | 5/2017 | Yeh et al. |
| 2017/0292722 A1 | 10/2017 | Vandermeulen |
| 2017/0370598 A1 | 12/2017 | Hamlin et al. |
| 2018/0036675 A1* | 2/2018 | Antony Prince .... B01D 61/368 |
| 2018/0187906 A1 | 7/2018 | Bahar et al. |
| 2018/0191012 A1 | 7/2018 | Zhang et al. |
| 2018/0328602 A1 | 11/2018 | Vandermeulen |
| 2019/0145639 A1 | 5/2019 | Allen et al. |
| 2019/0240614 A1 | 8/2019 | Beh et al. |
| 2019/0240623 A1 | 8/2019 | Beh et al. |
| 2019/0285290 A1 | 9/2019 | Woods et al. |
| 2019/0331353 A1 | 10/2019 | Edström et al. |
| 2020/0039314 A1 | 2/2020 | Minakuchi et al. |
| 2020/0063995 A1 | 2/2020 | LePoudre |
| 2020/0070094 A1 | 3/2020 | Hussaini et al. |
| 2020/0096212 A1 | 3/2020 | LePoudre |
| 2020/0164302 A1 | 5/2020 | Benedict et al. |
| 2020/0164312 A1 | 5/2020 | Beh et al. |
| 2020/0173671 A1 | 6/2020 | Rowe et al. |
| 2020/0182493 A1 | 6/2020 | Luttik |
| 2020/0278126 A1 | 9/2020 | Ide et al. |
| 2020/0326106 A1 | 10/2020 | Muthusubramanian |
| 2020/0333086 A1 | 10/2020 | Benedict et al. |
| 2020/0346164 A1 | 11/2020 | Verplancke |
| 2020/0384421 A1 | 12/2020 | Newbloom et al. |
| 2020/0388871 A1 | 12/2020 | Newbloom et al. |
| 2020/0393145 A1 | 12/2020 | Woods et al. |
| 2021/0254844 A1 | 8/2021 | Qasem et al. |
| 2021/0283528 A1 | 9/2021 | Pokornýet al. |
| 2021/0298246 A1 | 9/2021 | Lefers et al. |
| 2021/0354089 A1 | 11/2021 | Wu et al. |
| 2021/0370228 A1 | 12/2021 | Benedict et al. |
| 2022/0193612 A1 | 6/2022 | Torres et al. |
| 2022/0223885 A1 | 7/2022 | Beh et al. |
| 2022/0243932 A1 | 8/2022 | Benedict et al. |
| 2022/0299223 A1 | 9/2022 | Benedict et al. |
| 2022/0410070 A1 | 12/2022 | Beh |
| 2023/0141446 A1 | 5/2023 | Beh et al. |
| 2023/0173433 A1 | 6/2023 | Benedict et al. |
| 2023/0191312 A1 | 6/2023 | Benedict et al. |
| 2023/0264140 A1 | 8/2023 | Beh et al. |
| 2023/0280049 A1 | 9/2023 | Farese et al. |
| 2023/0294038 A1 | 9/2023 | Wallace |
| 2023/0332780 A1 | 10/2023 | Meles et al. |
| 2024/0131468 A1 | 4/2024 | Morajkar |
| 2024/0210050 A1 | 6/2024 | Ellman et al. |

FOREIGN PATENT DOCUMENTS

| | | |
|---|---|---|
| CN | 206055832 U | 3/2017 |
| CN | 108187459 A | 6/2018 |
| CN | 207455783 U | 6/2018 |
| CN | 111964168 A | 11/2020 |
| EP | 3060856 A1 | 8/2016 |
| EP | 3336064 A1 | 6/2018 |
| EP | 4063001 A1 | 9/2022 |
| JP | H0418919 A | 1/1992 |
| KR | 20130106530 A | 9/2013 |
| KR | 20150034545 A | 4/2015 |
| WO | WO-9528609 A1 | 10/1995 |
| WO | WO-2011062808 A1 | 5/2011 |
| WO | WO-2012170887 A2 | 12/2012 |
| WO | WO-2014181898 A1 | 11/2014 |
| WO | WO-2015143332 A2 | 9/2015 |
| WO | WO-2018032003 A1 | 2/2018 |
| WO | WO-2018119280 A1 | 6/2018 |
| WO | WO-2018191806 A1 | 10/2018 |
| WO | WO-2019089971 A1 | 5/2019 |
| WO | WO-2020112592 A1 | 6/2020 |
| WO | WO-2020112712 A1 | 6/2020 |
| WO | WO-2023122749 A2 | 6/2023 |
| WO | WO-2023201184 A1 | 10/2023 |
| WO | WO-2024086450 A1 | 4/2024 |
| WO | WO-2024129618 A1 | 6/2024 |
| WO | WO-2024211820 A2 | 10/2024 |

OTHER PUBLICATIONS

Al-Jubainawi et al., "Factors governing mass transfer during membrane electrodialysis regeneration of LiCl solution for liquid desiccant dehumidification systems", Sustainable Cities and Society, (Aug. 26, 2016); 28:30-41.

Al-Karaghouli et al., "Energy consumption and water production cost of conventional and renewable-energy—powered desalination processes", Renewable and Sustainable Energy Reviews 2013, 24, 343-356.

Anderson et al., "Capacitive deionization as an electrochemical means of saving energy and delivering clean water. Comparison to present desalination practices: Will it compete?", Electrochimica Acta 2010, 55 (12), 3845-3856.

Arellano et al., "Effects of pH on the degradation of aqueous ferricyanide by photolysis and photocatalysis under Solar radiation", Solar Energy Materials and Solar Cells 2010, 94 (2), 327-332.

Ashrae, et al., "Desiccant Dehumidification and Pressure Drying Equipment," 2012 ASHRAE Handbook—HVAC Systems and Equipment, Chapter 24, pp. 24.1-24.12.

Ashrae Standard, "Method of Testing for Rating Desiccant Dehumidifiers Utilizing Heat for the Regeneration Process", (2007); 4 pages.

Bajpayee et al., "Very low temperature membrane-free desalination by directional solvent extraction", Energy Environ. Sci. 2011,4 (5), pp. 1672-1675.

Beh et al., "A Neutral pH Aqueous Organic-Organometallic Redox Flow Battery with Extremely High Capacity Retention" ACS Energy Lett, 2017, vol. 2, pp. 639-644.

Biswas and Chattopadhyay, Heat Transfer in a Channel with Built-In Wing-Type Vortex Generators, Int J Heat Mass Transfer, 1992; 35(4):803-814.

Biswas et al., "Numerical and experimental determination of flow structure and heat transfer effects of longitudinal vortices in a channel flow," Int J Heat Mass Transfer, 1996; 39(16):3441-3451.

TCI Chemicals, "Ordering and Customer Service Neutral pH Aqueous Redox Flow Battery Materials BTMAP-Vi, BTMAP-Fc," Jan. 1, 2017, pp. 639.

Chen et al., "Experimental and numerical heat transfer investigation of an impingement jet array with V-ribs on the target plate and on the impingement plate," Intl J Heat Fluid Flow, 2017;68:126-138.

Cheng et al., "Double-Stage Photovoltaic/Thermal ED Regeneration for Liquid Desiccant Cooling System", Energy and Buildings, 51,2012, pp. 64-72.

Cheng et al., "Experimental investigation of an electrodialysis regenerator for liquid desiccant", Energy and Buildings, (2013); 67:419-425.

Cheng et al., "Performance analysis of a new desiccant pre-treatment electrodialysis regeneration system for liquid desiccant", 2013, Energy and Buildings, 66, 1-15 (Year: 2013).

Conde-Petit and Weber, "Open Absorption System for Cooling and Air Conditioning using Membrane Contactors—Annual Report 2006," Publication No. 260098, Project: 101310-0pen Absorption

(56) References Cited

OTHER PUBLICATIONS

System for Cooling and Air Conditioning using Membrane Contactors, Date of publication: Nov. 14, 2006, Contractor: M. Conde Engineering, 13 pages.

Conde-Petit and Weber, "Open Absorption System for Cooling and Air Conditioning Using Membrane Contactors—Final Report," Publication No. 280139, Project: 101310-0pen Absorption System for Cooling and Air conditioning using Membrane Contactors, Date of publication: Jul. 8, 2008, Contractor: M. Conde Engineering. 50 pages.

Conde-Petit, M. "Liquid Desiccant-Based Air-Conditioning Systems—LDACS," Proc. of the 1st European Conference on Polygeneration-Technologies and Applications, 217-234, A. Coronas, ed., Tarragona-Spain, Oct. 16-17, 2007 Published by Crever-Universitat, 17 pages.

Conde-Petit, M. Open Absorption Systems for Air-Conditioning using Membrane Contactors, Proceedings '15. Schweizerisches Status-Seminar Energie-und Umweltforschung im Bauwesen, Sep. 11-12, 2008—ETH Zurich, Switzerland. Published by Brenet-Eggwilstr. 16a, CH-9552 Bronschhofen-Switzerland (brenet@vogel-tech.ch), 12 pages.

Conde-Petit, Manuel, "Open Absorption System for Cooling and Air Conditioning using Membrane Contactors—Annual Report 2005," Publication No. Publication 260097, Project: 101310-0pen Absorption System for Cooling and Air conditioning using Membrane Contactors, Date of publication: Jan. 31, 2006, Contractor: M. Conde Engineering, 8 pages.

"Cooling tower Fill material: Gain a Deep Understanding," Linquip Technews, available online [retrieved on 022-03-01]. Retrieved from the internet: URL: https://www.linquip.com/blog/cooling-tower-fill-materiala/; 3 pgs.

Dai, "Increasing drought under global warming in observations and models", Nat. Clim. Change 2013, 3(1):52-58.

Darling et al., "Pathways to low-cost electrochemical energy storage: a comparison of aqueous and nonaqueous flow batteries", Energy Environ. Sci. 2014, 7 (11), 3459-3477.

Dean and Lowenstein, "A Solar Liquid-Desiccant Air Conditioner for Low-electricity Humidity Control—Summary Report," Energy and Water Projects Demonstration Plan SI-0822; TP-7 M0-56437-2, Nov. 2012; 41 pgs.

Desai et al., "Electrochemical Desalination of Seawater and Hypersaline Brines with Coupled Electricity Storage", ACS Energy Lett. 3, 2, 2018, pp. 375-379.

Desalination Experts Group, "Desalination in the GCC", 2014,47 pages.

Dipaola, "Saudi Arabia Gets Cheapest Bids for Solar Power in Auction" Bloomberg, Jan. 16, 2018, 3 pages.

Ebrahimi et al., "Numerical study of liquid flow and heat transfer in rectangular microchannel with longitudinal vortex generators," Applied Thermal Eng, 2015; 78:576-583.

Epsztein et al., "Activation behavior for ion permeation in ion-exchange membranes: Role of ion dehydration in selective transport", Journal of Membrane Science 580, 2019, pp. 316-326.

Ferguson et al., "Studies on Overvoltage. IX: The Nature of Cathode and Anode Discharge Potentials at Several Metal Surfaces1,2", J. Phys. Chem. (1937); 42(2):171-190.

Friedman et al. "Mapping Microscale Chemical Heterogeneity in Nation Membranes with X-ray Photoelectron Spectroscopy," Journal of the Electrochemical Society, (2018); 165(11):733-741.

Gao et al., "A review on integration and design of desiccant air-conditioning systems for overall performance improvements," Renewable and Sustainable Energy Reviews, Feb. 23, 2021;141:110809: 25 pgs.

Gentry and Jacobi, "Heat Transfer Enhancement on a Flat Plate using Delta-Wing Vortex Generators," ACRC Project 40, Jul. 1995:109 pgs.

Gong et al., "A zinc-iron redox-flow battery under $100 per kWh of system capital cost", Energy & Environmental Science, 2015. 5 pages.

Gong et al., All-Soluble All-Iron Aqueous Redox-Flow Battery, ACS Energy Letters, 2016, 1, pp. 89-93.

Google Search for "liquid desiccant air conditioning electrodialysis" dated Mar. 9, 2021, 2 pages.

Gowin, "Examining the economics of seawater desalination using the DEEP code", Nuclear Power Technology Development Section, I. A. E. A., Ed. Vienna, Austria, (2000); 88 pages.

Gu et al., "A multiple ion-exchange membrane design for redox flow batteries", Energy Environ. Sci. 2014, 7 (9), pp. 2986-2998.

Guler et al. "Performance-determining membrane properties in reverse electrodialysis", Journal of Membrane Science, (2013); 446:266-276.

Guo, Y., et al., "Using electrodialysis for regeneration of aqueous lithium chloride solution in liquid desiccant air conditioning systems," Energy and Buildings, 2016, 116, pp. 285-295.

Hilbert et al., "Correlations between the Kinetics of Electrolytic Dissolution and Deposition of Iron: I. The Anodic Dissolution of Iron", Journal of The Electrochemical Society 1971, 118(12):1919-1926.

Howell et al., "Overview of the DOE VTO Advanced Battery R&D Program", (Jun. 6, 2016); 24 pages.

Hu et al, "Long-Cycling Aqueous Organic Redox Flow Battery (AORFB) toward Sustainable and Safe Energy Storage", Journal of the American Chemical Society 2017, 139 (3), 1207-1214.

John et al., "Seasonal cycles of temperature, salinity and water masses of the western Arabian gulf", Oceanol. Acta 1990, 13 (3), 273-281.

Kaibara et al., "Study of Ion Transport across Amphoteric Ion Exchange Membrane. II. Transport of Symmetric Tetraalkylammonium Chlorides", Bull. Chem. Sco. Jpn, 56, 1983, pp. 1346-1350.

Kalpana et al., "Developments in liquid dessicant dehumidifcation system integrated with evaporative cooling technology," International Journal of Energy Research, vol. 46, No. 1, Apr. 2, 2021, pp. 61-88.

Khawaji et al., "Advances in seawater desalination technologies", Desalination 2008, 221 (1-3), 47-69.

Konopka et al., "Diffusion coefficients of ferri- and ferrocyanide ions in aqueous media, using twin-electrode thin-layer electrochemistry", Anal. Chem. (1970); 42(14):1741-1746.

Kozubal et al., "Low-Flow Liquid Desiccant Air-Conditioning: Demonstrated Performance and Cost Implications" NREL Technical Report, Sep. 2014, 104 pages.

La Mantia et al., "Batteries for efficient energy extraction from a water salinity difference", Nano Lett. 2011, 11 (4), 1810-3.

"Lazard's Levelized Cost of Storage—Version 2.0." 2016, 46 pages.

Lee et al., "Desalination of a thermal power plant wastewater by membrane capacitive deionization", Desalination 196, 2006, pp. 125-134.

Lee et al., "Rocking chair desalination battery based on Prussian blue electrodes", ACS Omega 2017, 2 (4), 1653-1659.

Li et al., "Numerical simulation on flow and heat transfer of fin-and-tube heat exchanger with longitudinal vortex generators," Intl J Thermal Sci; 2015; 92:85-96.

Li et al., "Photovoltaic-electrodialysis regeneration method for liquid desiccant cooling system", Solar Energy, vol. 83, 2009, pp. 2195-2204.

Li, F., et al., "Novel spacers for mass transfer enhancement in membrane separations," Journal of Membrane Science, May 2005; 253(1-2): 1-12.

Ling, Y., et al., "CFD simulation of fluid flow through spacer-filled membrane module: selecting suitable cell types for periodic boundary conditions," Desalination, 2008; 233(1):351-358.

Logan et al, "Membrane-based processes for sustainable power generation using water", Nature 2012, 488, 313.

Loutatidou, et al., "Capital cost estimation of RO plants: GCC countries versus southern Europe", Desalination 2014, 347, 103-111.

Lu et al., "Numerical simulation on performances of plane and curved winglet-Pair vortex generators in a rectangular channel and field synergy analysis," Intl J Thermal Sci, 2016;109:323-333.

Malhotra et al., "Use cases for stationary battery technologies: A review of the literature and existing projects", Renewable and Sustainable Energy Reviews 56, 2016, pp. 705-721.

(56) References Cited

OTHER PUBLICATIONS

Mathsisfun "Polygons" 7 pages, 2020, https://www.mathsisfun.com/geometry/polygons.html#:~:text=Polygons%20are%202-dimensional%20shapes.%20They%20are%20made%20of,Greek.%20Poly-%20means%20%22many%22%20and%20-gon%20means%20%22angle%22, 7 pages (Year: 2020).

McGovern et al., "On the cost of electrodialysis for the desalination of high salinity feeds", Applied Energy 136, Dec. 2014, pp. 649-661.

Moore et al., "Evaporation from Brine Solutions Under Controlled Laboratory Conditions; Report 77 for the Texas Water Development Board", May 1968, 77 pages.

Nair et al., "Water desalination and challenges: The Middle East perspective: a review", Desalin. Water Treat. 2013, 51 (10-12), 2030-2040.

Oren, "Capacitive deionization (CDI) for desalination and water treatment—past, present and future (a review)", Desalination 2008, 228 (1-3), 10-29.

Pasta et al., "A desalination battery" Nano Lett.2012, 12 (2), 839-43.

Patankar and Prakash, "An Analysis of the Effect of Plate Thickness on Laminar Flow and Heat Transfer in Interrupted-Plate Passages," Intl J Heat Mass Transfer, 1981; 24(11):1801-1810.

Patil et al., "Diffusivity of some zinc and cobalt salts in water", J. Chem. Eng. Data 1993, 38 (4), 574-576.

Petrova et al., "Perfluorinated hybrid membranes modified by metal decorated clay nanotubes", Journal of Membrane Science, vol. 582, Jul. 15, 2019, pp. 172-181.

Pismenskaya et al., "Can the electrochemical performance of heterogeneous ion-exchange membranes be better than that of homogeneous membranes?", Journal of Membrane Science, vol. 566, Nov. 15, 2018, pp. 54-68.

Sadrzadeh et al., "Sea water desalination using electrodialysis", Desalination 2008, 221 (1), 440-447.

Schaetzle et al., "Salinity Gradient Energy: Current State and New Trends", Engineering, vol. 1, Issue 2, Jun. 2016, pp. 164-166.

Scialdone et al., "Investigation of electrode material—Redox couple systems for reverse electrodialysis processes. Part 1: Iron redox couples", Journal of Electroanalytical Chemistry 2012, 681 (Supplement C), 66-75.

Scialdone et al., "Investigation of electrode material—redox couple systems for reverse electrodialysis processes—Part II: Experiments in a stack with 10-50 cell pairs", Journal of Electroanalytical Chemistry, vol. 704, Jun. 14, 2013, pp. 1-9.

Seto et al., "Seawater desalination by electrodialysis," Desalination, (1978); 25(1):1-7.

Shah et al., "Comparative Studies on Performance of Interpolymer and Heterogeneous ion-Exchange Membranes for Water Desalination by Electrodialysis", Desalination 172, 2005, pp. 257-265.

Shamshery et al., "Modeling the future of irrigation: A parametric description of pressure compensating drip irrigation miller performance," PLoS ONE, 2017; 12(4): e0175241: 24 pgs.

Solveichik, "Flow batteries: current status and trends", Chem. Rev. (2015); 115(20):11533-11558.

Song et al., "Interaction of counter rotating longitudinal vortices and the effect on fluid flow and heat transfer," Intl J Heat Mass Transfer, 2016; 93:349-360.

Stillwell et al., "Predicting the specific energy consumption of reverse osmosis desalination", Water 2016, 8 (12), 18 pages.

Tiggelbeck et al., "Experimental investigations of heat transfer enhancement and flow losses in a channel with double rows of longitudinal vortex generators," Intl J Heat Mass Transfer, 1993; 36(9):2327-2337.

"Two Stage Regenerator," AIL Research, Inc., available online [retrieved on Mar. 1, 2022]. Retrieved from the Internet: URL: http://ailr.com/our-technology/two-stage-regenerator/; 1 pg.

Urban, "Emerging Scientific and Engineering Opportunities within the Water-Energy Nexus", Joule, Dec. 20, 2017, pp. 665-688.

US Dept. of Energy, "Desiccant Enhanced Evaporative Air-Conditioning (DEVap): Evaluation of a New Concept in Ultra Efficient Air Conditioning," Technical Report NREL/TP-5500-49722, (2011), 71 pages.

US Dept. of Energy, "Energy Savings Potential and RD&D Opportunities for Commercial Building HVAC Systems", Dec. 2017, 172 pages.

US Dept. of Interior/US Geological Survey, "Estimated Use of Water in the United States in 2010," 2014, 64 pages.

Vermaas et al., "High Efficiency in Energy Generation from Salinity Gradients with Reverse Electrodialysis", ACS Sustainable Chem. Eng. 1, 2013, pp. 1295-1302.

Viswanathan et al., Cost and performance model for redox flow batteries, Journal of Power Sources, (2012); 247:1040-1051.

Vitillo et al., "Flow analysis of an innovative compact heat exchanger channel geometry," Intl J Heat Fluid Flow, 2016; 58:30-39.

Wang et al., "Continuous desalination with a metal-free redox-mediator", Journal of Materials Chemistry A, No. 7, 2019, 7 pages.

Woods, "Membrane processes for heating, ventilation, and air conditioning", Renewable and Sustainable Energy Reviews, vol. 33, 2014, pp. 290-304.

Wu and Tao, "Effect of longitudinal vortex generator on heat transfer in rectangular channels," Applied Thermal Engineering; 2012; 37:67-72.

Wu and Tao, "Numerical Study on laminar convection heat transfer in a channel with longitudinal vortex generator. Part B: Parametric study of major influence factors," Intl J Heat Mass Transfer, 2008; 51:3683-3692.

Wu et al., "Kinetic study on regeneration of Fe(II)EDTA in the wet process of NO removal", Chemical Engineering Journal 2008, 140 (1), 130-135.

Ye et al., "Performance of a mixing entropy battery alternately flushed with wastewater effluent and seawater for recovery of salinity gradient energy", Energy Environ. Sci. 2014, 7 (7), 2295-2300.

Zhang et al., "A Natural Driven Membrane Process for Brackish and Wastewater Treatment: Photovoltaic Powered ED and FO Hybrid System", Environmental Science and Technology, Sep. 4, 2013, pp. 10548-10555.

Zhang et al., "Performance optimization of heat pump driven liquid desiccant dehumidification systems," Energy and Buildings, Jun. 9, 2012;52:132-144.

Zhang et al., "The mechanism of heat transfer enhancement using longitudinal vortex generators in a laminar channel flow with uniform wall temperature," Intl J Thermal Sci, 2017; 17:26-43.

International Search Report and Written Opinion for PCT Application No. PCT/US2024/023423 mailed Nov. 29, 2024, 21 pages.

* cited by examiner

TABLE T1

| Typical mass flow ratio (kg air/kg dessicant) | Regeneration flow rate (mL/min) | Heat transported to process airstream (Watts) | Typical impact of efficiency | Air flow needed to regenerate desiccant (CFM) | Heat needed for regeneration @ 70F (kW) |
|---|---|---|---|---|---|
| 145 | 10 | 7 | 0.01% | 25 | 0.17 |
| 145 | 50 | 33 | 0.0% | 127 | 0.84 |
| 145 | 100 | 66 | 0.1% | 255 | 1.7 |
| 116 | 500 | 330 | 0.5% | 1273 | 8.4 |
| 87 | 1,000 | 660 | 0.9% | 2546 | 17 |
| 17 | 5,000 | 3,300 | 5% | 2674 | 20 |
| 9 | 10,000 | 6,601 | 9% | 2807 | 24 |
| 4 | 20,000 | 13,202 | 19% | 2948 | 32 |

FIG. 2

ULTRA LOW FLOW DESICCANT AIR CONDITIONING SYSTEMS DEVICES AND METHODS

CROSS-REFERENCE TO RELATED APPLICATIONS

This application is a continuation of International Application No. PCT/US2024/023423, filed on Apr. 5, 2024, which claims the benefit of U.S. Provisional Patent Application No. 63/457,984, each entitled "Ultra Low Flow Desiccant Air Conditioning Systems and Methods," filed Apr. 7, 2023, the disclosure of each of which is incorporated by reference herein in its entirety.

TECHNICAL FIELD

The present disclosure relates generally to heating, ventilation and air conditioning (HVAC) systems, and more specifically, to air conditioning systems that use ultralow flow of liquid desiccant to remove moisture and conditions air streams.

BACKGROUND

Heating, ventilation, and air conditioning (HVAC) systems provide cooling and dehumidification of a building space during the summer, and heating and humidification of such a space during winter. These systems typically operate on any combination of fresh air and recirculated air. Buildings, particularly commercial buildings, require a certain amount of ventilation of fresh, outside air, in order to prevent occupants being exposed to poor air quality caused by excess $CO_2$, volatile organics and other contaminants present in building and furnishings materials. Heating, cooling, humidification, and/or dehumidification of ventilation fresh outside air, often referred to as conditioning of ventilation air, can be a major source of primary energy consumption in buildings. For example, the U.S. Energy Information Administration (EIA) estimates that in 2020, electricity use for cooling the interior of buildings (space cooling) by the U.S. residential and commercial sectors was about 392 billion kilowatt-hours (kWh), which is equal to about 10% of total U.S. electricity consumption in 2020. Consequently, there is a need to develop air conditioning systems that reduce electricity and fossil fuel use for heating and cooling of buildings.

SUMMARY

Systems, devices and methods for ventilating, heating, cooling, and/or conditioning building spaces are described herein. In some embodiments, a system comprises: a housing and a distributor component. The housing includes an interior volume and a gas inlet port. The gas inlet port is configured to receive a gas and direct the gas at a first mass flow rate across a media bed disposed within the interior volume of the housing. The distributor component includes a conduit and an array of emitters. The conduit is coupled to the housing and configured to receive a liquid desiccant including water and a salt at a first salt concentration by weight. The array of emitters is disposed along the conduit, with each emitter from the array of emitters configured to dispense the liquid desiccant to the media bed at a second mass flow rate such that the liquid desiccant (1) wets the media bed to transfer water between the liquid desiccant and the gas, and (2) exits the housing via an outlet port. The first mass flow rate is selected so that when the gas transfers water with the liquid desiccant dispensed at the second mass flow rate the liquid desiccant at the outlet port becomes regenerated and includes the salt at a second salt concentration by weight, the second salt concentration being larger than the first salt concentration.

Other embodiments are directed to a method of regenerating a liquid desiccant with a desorber. The desorber includes a housing defining an interior volume, and a distributor component including a conduit and an array of emitters disposed along the conduit. The method comprises directing a gas at a first mass flow rate, the gas having a predetermined temperature and humidity, across a media bed disposed within the interior volume of the housing. The method further comprises receiving the liquid desiccant at the conduit, with the liquid desiccant including water and a salt at a first salt concentration by weight. The method further comprises dispensing, through each emitter of the array of emitters, the liquid desiccant to the media bed at a second mass flow rate such that the liquid desiccant wets the media bed and water is transferred from the liquid desiccant to the gas; and directing after the dispensing, directing the liquid desiccant out of the housing via an outlet port. The first mass flow rate is selected so that when the water is transferred to the gas with the liquid desiccant dispensed at the second mass flow rate, the liquid desiccant at the outlet port becomes regenerated and includes the salt at a second salt concentration by weight, the second salt concentration being larger than the first salt concentration.

In another embodiment, a method involves regenerating a liquid desiccant with a desorber. The desorber includes a media bed and a distributor component. The method comprises receiving, at the distributor component, the liquid desiccant having a first salt concentration by weight. The method further comprises dispensing a plurality of streams of the liquid desiccant to the media bed at a liquid desiccant mass flow rate; and flowing a gas at a gas mass flow rate across the media bed when the liquid desiccant is being dispensed such that water is transferred from the liquid desiccant to the gas, the gas mass flow rate being at least about 20 times the liquid desiccant mass flow rate. The method further comprises collecting the liquid desiccant at an outlet port of the desorber, with the liquid desiccant at the outlet port having a second salt concentration by weight, the second salt concentration being larger than the first salt concentration.

In some embodiments, a system can include an absorber unit and a desorber unit. The absorber unit can comprise an absorber gas inlet, an absorber inlet port, and an absorber outlet port. The absorber gas inlet can be configured to receive a flow of a supply air stream, with the supply air stream including moisture at a first moisture concentration. The absorber inlet port can be configured to receive a flow of a liquid desiccant and direct the flow of the liquid desiccant to an absorber media bed disposed within the absorber. The absorber media bed can be configured to expose the supply air stream to the liquid desiccant to remove moisture from the supply air stream and produce a conditioned air stream. The absorber gas outlet port can be configured to collect the liquid desiccant after the exposure to the supply stream. The desorber unit can comprise a desorber gas inlet, a distributor component, and a desorber outlet port. The desorber gas inlet can be configured to receive a flow of a regeneration stream at a first mass flow rate value. The distributor component can include a conduit fluidically coupled to the absorber outlet port, the conduit configured to receive at least a portion of the liquid desiccant from the absorber; the portion of the liquid desiccant including at least one salt at a first weight percent. The distributor component can also include an array of emitters disposed along the conduit, each emitter from the array of emitters configured to direct the portion of the liquid desiccant at a second mass flow rate value to a desorber media bed disposed within the desorber, the desorber media bed configured to expose the portion of the liquid desiccant to the regeneration stream to remove moisture from the portion of the liquid desiccant and produce a concentrated liquid desiccant. The desorber outlet port is configured to direct the concentrated liquid desiccant to the absorber inlet port, the concentrated liquid desiccant including the at least one salt at a second weight percent.

In some embodiments, an apparatus can include a housing, and a distributor component. The housing can include an interior volume and a gas inlet port. The gas inlet port can be configured to receive a regeneration gas and direct the regeneration gas at a first mass flow rate across a media bed disposed within the interior volume of the housing. The distributor component can include a conduit coupled to the housing, the conduit configured to receive a liquid desiccant including water and a salt at a first concentration by weight. The distributor component can also include an array of emitters disposed along the conduit, each emitter from the array of emitters configured to dispense the liquid desiccant to the media bed at a second mass flow rate such that the liquid desiccant (1) wets the media bed to transfer water to the regeneration gas, and (2) exits the housing via an outlet port, wherein the first mass flow rate is at least about 30 times the second mass flow rate, and the liquid desiccant at the outlet port includes the salt at a second concentration by weight, the second concertation being greater than the first concentration.

BRIEF DESCRIPTION OF THE DRAWINGS

FIG. 2 is a table showing the amount of heat transported to the process air stream (e.g., heat transported by the liquid desiccant to the absorber) expressed in W and as a percent of cooling capacity and amount of heat needed to heat the regeneration air stream to regenerate the desiccant.

DETAILED DESCRIPTION

Figure 1:
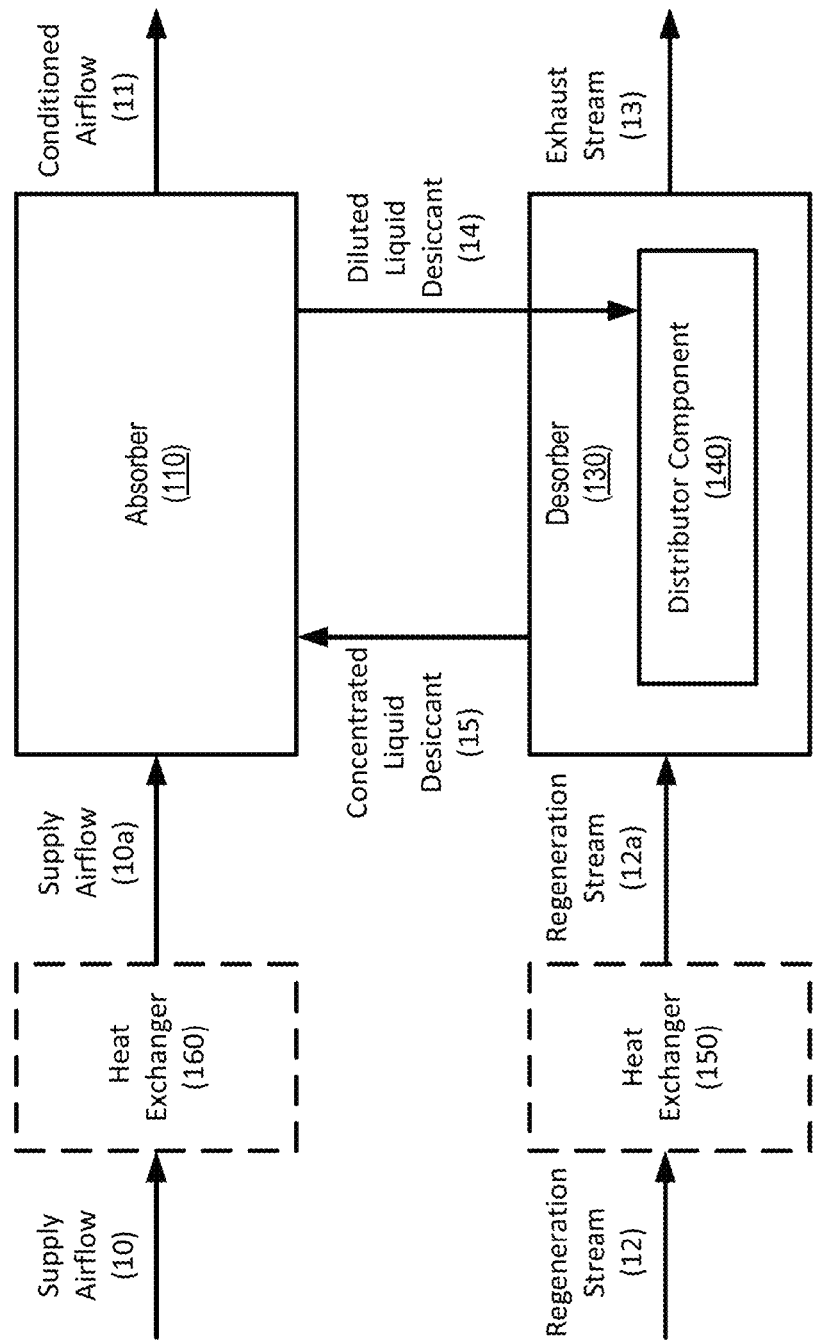
FIG. 1 is a flow diagram of an ultra-low flow liquid desiccant air conditioning system, according to an embodiment.

Conventional HVAC systems are used for the conditioning and dehumidification of air in residential and/or commercial buildings. HVAC dehumidify an air stream using an evaporator cooling coil that reduces the temperature of the air stream and causes moisture to condense on fins and/or other heat exchange surfaces of the cooling coil. The air stream leaving the cooling coil is relatively cold (e.g., the air leaving the cooling coil can have a temperature of about 50 to 55° F.) and has a high relative humidity (e.g., 90-100% RH Relative Humidity). The direct use of these air streams for space conditioning can result in mold formation and overly cold building spaces. Consequently, conventional systems re-heat the air streams to increase the air stream temperature and reduce their relative humidity. The use of cooling coils to remove moisture from the air stream by condensation is an energy intensive process due to the large latent heat of water. Furthermore, the use of heat exchangers to re-heat the air stream causes additional energy requirements, and thus reduces and/or limits the energy efficiency of HVAC systems.

An alternative approach to conventional HVAC systems include liquid desiccant technology (e.g., LD technology) which uses a liquid desiccant to remove water and/or moisture from air. Liquid desiccants can absorb water from a gas stream, due its hygroscopic nature. Liquid desiccant can be exposed to gas streams comprising water and/or moisture, and the water and/or moisture can be transferred and/or absorbed in the liquid desiccant. Liquid desiccant materials can include a wide variety of substances and/or solutions such as aqueous (or non-aqueous) solutions of chloride species (e.g., sodium, calcium, cobalt, magnesium, potassium, and/or hydrogen chloride), iodide species (e.g., sodium, potassium, and/or hydrogen iodide, nitrogen triiodide, carbon tetraiodide, and the like), chlorine fluoride, bromomethane, nitrate species, poly and ethylene glycols, as well as various salts and other materials. Lithium chloride (LiCl) is a frequently used liquid desiccant because of its low cost and desirable properties including its capacity to absorb and desorb water, and its stability in liquid form without formation of crystalline phases over a wide range of concentrations and operating conditions. Unlike conventional HVAC systems, the removal of water and/or moisture from an air and/or other gas stream via a liquid desiccant does not require cooling the air and/or other gas stream to condense its water and/or moisture (and thus, does not involve the large latent heat loads from cooling water and/or moisture). Instead, the hydroscopic nature of the liquid desiccant material, thermodynamically favors the transfer of water and/or moisture from the air and/or other gas stream to the liquid desiccant. As a result, liquid desiccants can be used to remove water and/or moisture from air without involving the high energy demands of conventional HVAC systems with cooling coils. Despite the advantages of liquid desiccants, their use for the conditioning of air streams can involve potential challenges such as corrosiveness and propensity to become airborne, resulting in a considerable risk of corrosion of nearby metal components. Approaches to mitigate the loss of liquid desiccant or desiccant carryover include post treatment of the conditioned air streams with filters. Although installing filters to condition the air streams may reduce loss of liquid desiccant or desiccant carryover, their implementation imposes additional energy demands to move air through the filters, resulting in reduced overall energy efficiency. Additionally, the use of filters may introduce considerable maintenance costs.

Liquid desiccant air conditioning systems include a first subsystem (oftentimes called an absorber, air treatment and/or air conditioner) for treating an incoming air stream with the help of a liquid desiccant. The liquid desiccant air conditioning systems can also include a second subsystem (referred to as a desorber and/or regenerator) for regenerating the liquid desiccant after it has performed its dehumidification function. Regeneration of the liquid desiccant generally involves somehow removing the excess water from the desiccant, after the desiccant has been used in the absorber. The removal of the excess water from the desiccant produces a higher concentration of the desiccant material in the liquid desiccant, which can be re-deployed on the absorber. Regeneration of the liquid desiccant can be performed in several ways. For example, liquid desiccants can be regenerated using thermal regenerators or electrochemical regenerators or electrochemical desorbers (ECDs). Thermal regenerators use single or multistage thermal boiling desorbers, two-way thermal desorbers, and/or three-way thermal membrane desorbers that use a secondary air stream that is pre-heated from an energy exchanger (e.g., a waste-heat source from a compressor) to provide the energy required to remove water and/or moisture from the liquid desiccant. In two-way systems, air and the liquid desiccant are the only fluids flowing through the energy exchanger. In three-way systems, an additional coolant is introduced to absorb heat for air dehumidification and/or add heat for air humidification. Electrochemical desorbers (ECDs) use a power source to separate a desiccant solution into a higher and a lower concentration desiccant stream by driving ions in the ionic desiccant solution through ion-exchange membranes. Generally, ECDs include multiple stages of separation allowing the ECD to achieve very high concentrations of the regenerated liquid desiccant, for example an increase in concentration from 20 to 31% is generally possible. More conventional two-way liquid desiccant systems can achieve approximately 0.3-0.5% concentration improvement. Three-way liquid desiccant systems have been shown to achieve 1.5 to 2.5% concentration increases.

Regardless of the specific approach used to regenerate the liquid desiccant, the amount of liquid desiccant flowing from the air treatment side to the regeneration side of the system is a significant factor in the overall energy savings that the system can obtain. Desorbers and/or regenerators that produce low concentration increases in the liquid desiccant during regeneration typically require large desiccant flow rates in order to achieve moisture removal from a given air stream. These large liquid desiccant flow rates have two adverse effects. First, since the liquid desiccant must be transferred from the desorber after regeneration to the absorber for treating the incoming airstream, the liquid desiccant will transport an amount of heat proportional both to (1) the liquid desiccant flow rate and (2) the temperature difference between the absorber and the desorber. In the case of desorbers that produce low-concentration-difference and use high-flow rates, this heat transport will significantly reduce the system efficiency. This reduction of the system's efficiency can be so large as to require a desiccant-to-desiccant heat exchanger disposed between the absorber/desorber loop: a solution that adds complexity, a failure point, equipment cost, and a maintenance issue. Second, since the regeneration process requires pre-heating a secondary airstream (e.g., a regeneration airstream), the use of large desiccant flow rates increases the heat loads of the regeneration side of the system, leading to higher overall energy consumption and reduced system efficiency. Conversely, desorbers and/or regenerators that produce high concentration increases in the liquid desiccant do not require the use of large desiccant flow rates in order to achieve moisture removal from an air stream. As such, the use of ultra-low desiccant flow rates on the regeneration side can reduce the heat/energy loads of the system, leading to increased energy efficiency. For example, as shown in FIG. 2, using larger desiccant regeneration flow rates, such as 10,000 mL/min, highlights these two adverse effects: (1) a ~9% (6,601 W) loss of cooling as heat is carried from the regeneration to process airstreams and (2) a high heat requirement on the system of 24 kW to heat airflow of 2,807 CFM, a heat load high enough that many systems may have insufficient heat available for regeneration in many conditions. In contrast, reducing this to the ultra-low desiccant flow rate regime, such as 1,000 mL/min, solves these problems by reducing efficiency loss to 660 W (typically 0.9%) and heat requirements of 17 kW. In some embodiments, the systems disclosed herein can include a regenerated liquid desiccant which can transport and/or transfer heat to a process air stream (e.g., a conditioned air flow), with the transported heat being no more than about 2 KW, no more than about 1.5 kW, no more than about 1.0 kW, no more than about 0.9 kW, no more than about 0.8 KW, no more than about 0.7 kW, no more than about 0.6 kW, no more than about 0.5 KW, no more than about 0.4 kW, no more than about 0.3 kW, no more than about 0.2 kW, no more than about 0.1 kW, or no more than about 0.05 KW, inclusive of all values and ranges therebetween. Optionally and/or alternatively, in some embodiments the systems disclosed herein can include a regenerated liquid desiccant which can transport and/or transfer heat to a process air stream (e.g., a conditioned air flow) with the transported heat representing a percentage of the system's cooling capacity of no more than about 5%, no more than about 4%, no more than about 3%, no more than about 2%, no more than about 1%, no more than about 0.75%, no more than about 0.5%, no more than about 0.25%, no more than about 0.1%, or no more than about 0.05%. inclusive of all values and ranges therebetween.

The flow rate of the liquid desiccant is one of many factors that impact the effectiveness of the desorber. The maximum effectiveness obtainable for a desorber with a given temperature and desiccant concentration is met when the desiccant leaving the desorber comes to equilibrium with the regeneration airstream (e.g., with the air entering the desorber in the case of a counter-flow configuration). Under these conditions, the effectiveness of the desorber can be assigned a numerical value of 1.0. For desorbers in which the desiccant leaving the desorber does not reach equilibrium with the regeneration airstream, the effectiveness can be assigned a numerical value between 0 and 1.0, proportional to how close the desiccant leaving the desorber is from reaching equilibrium with the regeneration airstream. The effectiveness of the desorber will depend on the temperature and humidity of the regeneration airstream, but designing a desorber to optimize effectiveness can use an appropriate regeneration airflow condition(s) representing, for example, typical case, worst case, and/or any suitable variety of characteristic cases. The effectiveness of any desorber, at a given flow rate, will depend on several design choices of the desorber including, for example, material selection and/or height/length of the interaction path with the regeneration air stream. For a given design condition, extending the length of the media bed by 25%, 50%, or 100% can increase the effectiveness at a given flow rate and emitter density by 10-25%, 20-45% and 40-90% respectively. Similarly, for a given length and emitter density increasing the flow rate by 25%, 50% and 100% can increase the effectiveness by 8-18%, 16-36%, and 33-71% respectively. In some embodiments, the height and/or the length of the desorber can be selected to provide at least about 40% effectiveness, at least about 45% effectiveness, at least about 50% effectiveness, at least about 55% effectiveness, at least about 60% effectiveness, at least about 65% effectiveness, at least about 70% effectiveness, at least about 75% effectiveness, at least about 80% effectiveness, at least about 85% effectiveness, at least about 90% effectiveness, or at least about 95% effectiveness, inclusive of all values and ranges therebetween.

The use of low and/or ultra-low flow rates of liquid desiccant, particularly in the regeneration side of the system, introduces significant challenges to maximizing effectiveness such as achieving an effective distribution of the low volumetric flow of liquid desiccant on the contact media included in the desorber (e.g., dispersing small amounts of liquid descant on all the contact media included in the desorber to produce an even and/or homogeneous concentration of liquid desiccant). The even distribution of liquid desiccant on the contact media facilitates heat and mass transfer processes to take place which ultimately increases the effectiveness of the regenerator allowing it to remove moisture from a substantial majority of the liquid desiccant and transfer it to a regeneration stream. To accomplish an even (or about even) distribution of liquid desiccant on the contact media of the desorber, the systems and devices disclosed herein may incorporate multiple drip emitters (e.g., also referred to as emitters) designed to dispense, emit, and/or flow a uniform and controlled amount of liquid desiccant (e.g., a controlled flowrate). These emitters are designed to dispense and/or emit the liquid desiccant at the same or at very similar flow rates. The emitters can be disposed on a tube, pipe, channel, and/or conduit within the desorber to deliver the liquid desiccant to the contact media. As fluid is nearly incompressible this places a requirement that the pressure drop between the entrance to an emitter and the exit from that emitter must be much larger than both the pressure drop of the liquid desiccant (1) as it enters the conduit and (2) as it travels in the conduit from the inlet of the conduit, between the emitters and to the last one of the emitters (e.g., the pressure drop across the conduit). In that way, the difference in pressure between the entrance to the first emitter and the last emitter in a series of emitters is much less than the pressure drop between the emitter inlet and outlet for every emitter in the series. In some embodiments, the ratio of the pressure drop across the emitters in a series of emitters is equal to, double, triple, or more than triple the pressure drop between the emitter with the highest pressure inlet and the emitter with the lowest pressure inlet. In some embodiments, the pressure drop between these two emitters (e.g., the emitter with the highest pressure inlet and the emitter with the lowest pressure inlet) can be about 1 psi, 3 psi, 6 psi, 9 psi, or 12 psi. The pressure drop between the inlet and outlet of the emitters can by about 1 psi, 5 psi, 10 psi, or more than 10 psi. In some embodiments the pressure from the inlet of a conduit in which a series of emitters are disposed to the most distant emitter in the conduit must be sufficiently low to allow the pressure of the inlet at the final emitter to equal or exceed the pressure drop across the emitter.

The use of low and/or ultra-low flow rates can also introduce a challenge associated with loss of liquid desiccant due to carryover on the regeneration stream. The relatively small amounts of liquid desiccant distributed on the contact media of the desorber can be physically removed from the desorber by the regeneration airstream. More specifically, the distribution of low and/or ultra-low flow rates of liquid desiccant using a conventional liquid manifold can cause formation of droplets of liquid desiccant (e.g., liquid desiccant sputtering). These droplets become airborne and are picked up and/or carried by the regeneration stream out of the desorber, causing loss of liquid desiccant in the system as well as considerable corrosion problems. Preventing this carryover requires careful engineering of various characteristics of the emitter and media bed systems. This includes, for example, selection and placement (i.e., density per square meter of cross sectional areas) of the emitters, the amount of desiccant distributed by each emitter and the resultant desiccant flow velocity, the material used to construct the media bed, the geometry of the media bed, and/or the design of the interface between the emitter and the media bed including the distance between the emitters and the media bed and the degree to which the emitters are embedded in the media bed.

Figure 11:
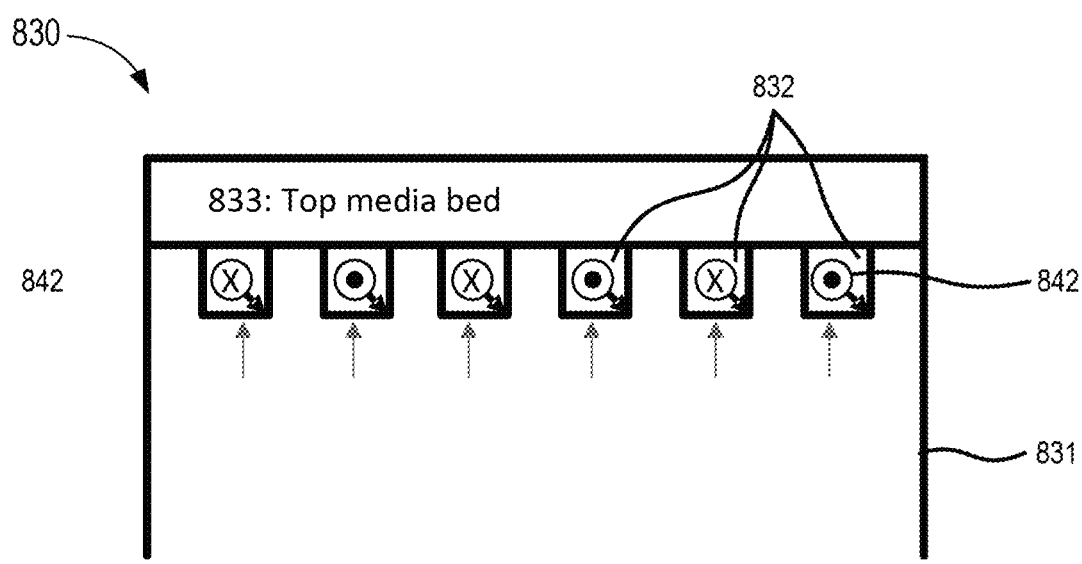
FIG. 11 is a cross sectional side view of a portion of the desorber unit shown in FIG. 3, displaying a trench design to accommodate a distributor component of the desorber unit, according to an embodiment.

In some embodiments the material used to construct the media bed can be chosen to be cellulose while in other embodiments it can be fiberglass. In some embodiments, the material used to construct the media bed can be a polymer. In some embodiments, the material used to construct the media bed can be any suitable combination of the materials disclosed herein. The media bed can be any suitable size and shape. For example, in some embodiments, the media bed can be a three-dimensional shape defined by a square or a rectangular cross section area and a length (thus forming a cubic or a rectangular prism shape). In some embodiments, the media bed can be a three-dimensional shape defined by a polygon cross section area and a length (thus forming a polyhedron shape). In some embodiments, the media bed can be a three-dimensional shape defined by a circular cross section and a length (this forming a cylinder). In some embodiments, the liquid desiccant and the regeneration airstream can be disposed in a counter-flow configuration. In some embodiments, the liquid desiccant and the regeneration airstream can be disposed in a crossflow configuration. A counter-flow configuration increases the effectiveness of the desorber while a crossflow will typically allow a less torturous path for the regeneration airflow thus reducing the energy needed to move the regeneration air. In some embodiments the emitters are disposed on the conduit, with the conduit being rested on the media bed, (e.g., the conduit with the emitters are in physical contact with the media bed). In some embodiments, the emitters are disposed on the conduit, with the conduit being disposed at a predetermined distance from the media bed. In some embodiments, this distance can be at least about 1/10th of the diameter of the conduit, at least about 1/8th of the diameter of the conduit, at least about 1/6th of the diameter of the conduit, at least about 1/4th of the diameter of the conduit, at least about 1/2th of the diameter of the conduit, or at least about equal to the diameter of the conduit, inclusive of all ranges and values therebetween. In some embodiments, the emitters are placed in trenches directly in the media bed. In some embodiments, the emitters are placed in crenulations. These trenches and/or crenulations can be of various sizes and or depths including half the diameter, the full diameter, twice the diameter, or more than twice the diameter of the liquid desiccant bearing conduit. In some embodiments an additional layer of media bed can be place above the conduit and emitters, trenches, and/or crenulations, as shown in FIG. 11.

As used in this specification and/or any claims included herein the singular forms "a," "an," and "the" include plural referents unless the context clearly dictates otherwise. Thus, for example, the term "a member" is intended to mean a single member or a combination of members, "a material" is intended to mean one or more materials, and/or the like.

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

As used herein, the term "set" can refer to multiple features or a singular feature with multiple parts. For example, when referring to a set of walls, the set of walls can be considered as one wall with multiple portions, or the set of walls can be considered as multiple, distinct walls. Thus, a monolithically constructed item can include a set of walls. Such a set of walls may include multiple portions that are either continuous or discontinuous from each other. A set of walls can also be fabricated from multiple items that are produced separately and are later joined together (e.g., via a weld, an adhesive, or any suitable method).

As used herein, the terms "about," "approximately," and/or "substantially" when used in connection with stated value(s) and/or geometric structure(s) or relationship(s) is intended to convey that the value or characteristic so defined is nominally the value stated or characteristic described. In some instances, the terms "about," "approximately," and/or "substantially" can generally mean and/or can generally contemplate a value or characteristic stated within a desirable tolerance (e.g., plus or minus 10% of the value or characteristic stated). For example, a value of about 0.01 can include 0.009 and 0.011, a value of about 0.5 can include 0.45 and 0.55, a value of about 10 can include 9 to 11, and a value of about 1000 can include 900 to 1100. Similarly, a first surface may be described as being substantially parallel to a second surface when the surfaces are nominally parallel. While a value, structure, and/or relationship stated may be desirable, it should be understood that some variance may occur as a result of, for example, manufacturing tolerances or other practical considerations (such as, for example, the pressure or force applied through a portion of a device, conduit, lumen, etc.). Accordingly, the terms "about," "approximately," and/or "substantially" can be used herein to account for such tolerances and/or considerations.

FIG. 1 shows a schematic illustration of an ultra-low flow liquid desiccant air conditioning system 100 for the conditioning and dehumidification of air, according to an embodiment. The ultra-low flow liquid desiccant air conditioning system 100, which can also be referred to herein as the ultra-low flow LD system 100, or the system 1000, includes an absorber 110, and a desorber 130 comprising a distributor component 140. The adsorber 110 can receive a supply airflow 10, which can be a stream and/or flow of ambient air and/or any suitable air stream containing moisture that requires dehumidification and/or conditioning. The absorber 110 can remove water and/or moisture from the supply airflow 10 by exposing the supply airflow 10 (or a supply airflow 10a, if the system includes an optional heat exchanger 160, as further described herein) to a liquid desiccant stream (not shown in FIG. 1). The liquid desiccant stream can be a liquid solution containing one or more salts, which can absorb water and/or moisture. Exposure of the supply airflow 10 to the liquid desiccant stream (e.g., contacting the supply airflow 10 with the liquid desiccant stream) causes water and/or moisture included in the supply airflow 10 to be transferred and/or absorbed on the liquid desiccant stream, producing a low moisture conditioned airflow 11. The absorption of water and/or moisture present in the supply airflow 10 decreases the concentration of salts in the liquid desiccant stream, generating a diluted liquid desiccant stream which requires regeneration. In some implementations a first portion and/or fraction of the diluted desiccant stream can be recirculated back to the absorber 110, while a second portion and/or fraction of the diluted desiccant stream is sent to the desorber 130 for regeneration (e.g., the diluted liquid desiccant 14 shown in FIG. 1). FIG. 1 also shows the desorber 130 can receive a regeneration stream 12 and expose the regeneration stream 12 (or a regeneration stream 12a, if the system includes an optional heat exchanger 150, as further disclosed herein) to the diluted liquid desiccant 14 to remove the excess water and/or moisture present in the diluted liquid desiccant 14. The regeneration stream 12 can be an ambient air stream and/or any suitable regeneration gas stream that can remove water and/or moisture from a liquid desiccant. The desorber 130 includes a distributor component 140 that dispenses, directs and/or distributes an ultra-low flow rate of diluted liquid desiccant 14 into the desorber 130 to contact the regeneration stream 12. Contacting the diluted liquid desiccant 14 with the regeneration stream 12 causes water and/or moisture present in the diluted liquid desiccant 14 to be transferred and/or desorbed from the diluted liquid desiccant 14 and into the regeneration stream 12. The transfer of water and/or moisture produces a concentrated liquid desiccant 15 and an exhaust stream 13, as shown in FIG. 1. The exhaust stream 13 be discharged to the ambient, while the concentrated liquid desiccant 15 can be recirculated back to the absorber 110, where it can be included in a liquid desiccant stream to remove water and/or moisture from the supply airflow 10. In that way, the ultra-low flow LD system 100 can flow desiccant in a loop between the absorber 110 and the desorber 13 in which the diluted liquid desiccant 14 is sent from the absorber 110 to the desorber 130 for regeneration after removing moisture from the supply airflow 10 (or the supply airflow 10a), and the concentrated liquid desiccant 15 (produced at the desorber 130 after removing moisture with the regeneration stream 15) is sent back to the absorber 110 to process the supply airflow 10 (or the supply airflow 10a)). It is worth noting that in some implementations at least a portion of the liquid desiccant can be recirculated in the absorber 110. In such implementations, a first portion of liquid desiccant that has been contacted with the supply airflow 10 (or the supply airflow 10a) can be recirculated to the absorber 110 to continue to process the supply airflow 10, while a second portion of the liquid desiccant (e.g., the diluted liquid desiccant 14) can be diverted to the desorber 130 for regeneration. The concentrated liquid desiccant 15 produced in the desorber 130 from the diluted liquid desiccant 14 can be sent back to the absorber 110 where it is mixed with the first portion of the liquid desiccant recirculated, producing the liquid desiccant stream used for removing moisture of the supply airflow 10.

In some implementations, the removal of water and/or moisture from the diluted liquid desiccant 14 may require heating the regeneration stream 12 to a predetermined temperature prior to entering the desorber 130. Consequently, in some implementations, the ultra-low flow LD system 100 can include an optional heat exchanger 150. The heat exchanger 150 can be any suitable heat exchanger device that receives and heats the regeneration stream 12 to a desired temperature, producing a regeneration stream 12a. The regeneration stream 12a can be admitted to and/or received in the desorber 130; and be exposed to the diluted liquid desiccant 14 to remove water and/or moisture the diluted liquid desiccant 14; and produce the concentrated liquid desiccant 15 and the exhaust stream 13. Similarly, in some implementations the supply airflow 10 may require a cooling step prior to entering the absorber 110 for removal of water and/or moisture. In such implementations, the ultra-low flow LD system 100 can include an optional heat exchanger 160. The heat exchanger 160 can be any suitable heat exchanger device, similar to the heat exchanger 150, that receives and heats the supply airflow 10 to a desired temperature, producing a supply airflow 10a. The supply airflow 10a can be admitted to and/or received in the absorber 110; and be exposed to a liquid desiccant stream to remove water and/or moisture from the supply airflow 10a; producing the conditioned airflow 11 and the diluted liquid desiccant 14, as described above. It is worth noticing that although the ultra-low flow LD system 100 includes a heat exchanger 160 to cool the supply airflow, the heat exchanger 160 is not configured to act as the primary means to remove moisture from the supply airflow 10. Instead, the heat exchanger 160 is designed to pre-condition the supply airflow to balance the heat generated by the absorption of water and/or moisture in the liquid desiccant. Therefore, the heat exchanger 160 does not have the high energy demands of conventional HVAC systems.

The absorber 110 can be any suitable component that receives the supply airflow 10 (or the supply airflow 10a) and provides a liquid/gas interface that allows exposing the supply airflow to a liquid desiccant to remove water and/or moisture from the supply air flow 10 (or the supply airflow 10a). The absorber 110 can include a housing, a plurality of inlet and outlet ports, and a contact media. The housing of the absorber 110 can be any suitable enclosure that defines at least one internal volume and/or chamber for accommodating one or more components of the absorber 110. The housing can be any suitable size and shape. For example, in some implementations the housing can be a cylindrical shape defined by a length and a circular cross-sectional area. In other implementations the housing can be a three-dimensional shape defined by a length and a suitable cross-sectional area such as a square, oval, ellipse, hexagon, heptagon, octagon, or any suitable polygon shape. In some implementations the housing can be a shape selected to maximize an interior volume for housing and/or accommodating the contact media and/or other components of the absorber 110, while minimizing the absorber 110 footprint (e.g., the external area and/or volume occupied by the absorber 110). The housing of the absorber 110 can be made out of any suitable material having sufficient rigidity, and resistance to degradation due to exposure to the liquid desiccant stream and/or other species present during conditioning of the supply airflow 10. For example, in some implementations the housing of the absorber 110 can be made of and/or include metals, metal alloys, polymers, and/or composite materials including, but not limited to iron, nickel cobalt, aluminum, steel, copper, chrome, polyethylene, polyvinyl chloride, polycarbonates, poly(methyl methacrylate), fiberglass, and/or any other suitable material. In some implementations, the material forming the housing can be coated with a protective coating to reduce unwanted degradation and/or corrosion (e.g., an anti-corrosion coating), which can potentially cause affect the structural integrity of the housing or cause leaks of the supply airflow 10, the liquid desiccant, the conditioned airflow 11, and/or contact media over time.

The absorber 110 can include a plurality of inlet and outlet ports designed to receive and flow the supply airflow 10 (or the supply airflow 10a) and the liquid desiccant stream within the absorber 110. In some implementations the absorber 110 can include at least one gas inlet port and one gas outlet port that allow flowing the supply airflow 10 (or the supply airflow 10a). The absorber 110 can also include at least one liquid inlet port and one liquid outlet port that allow flowing a liquid desiccant stream within the absorber 110. Furthermore, in some implementations the absorber 110 can also include multiple inlet and outlet ports (auxiliary ports) for flowing any suitable number of auxiliary streams required for conditioning the supply airflow (e.g., a refrigerant stream, a coolant stream, a chilled water stream or the like). In some implementations, the absorber 110 can also include any additional components and/or accessories that facilitate flowing the supply airflow 10 and the liquid desiccant stream within the housing, such as for example, valves, fittings, unions, couplings derivations, splitters, gauges, sensors, and the like.

As disclosed above, the absorber 110 can also include a contact media used to facilitate the contacting of the supply airflow 10 (or the supply airflow 10a) with a liquid desiccant stream. The contact media can be disposed in the at least one interior volume, chamber, and/or compartment defined by the housing. The contact media can be and/or include any suitable vapor/liquid mass transport unit operation component such as, for example, one or more packed beds, tray towers, spray towers, bubble columns, membranes, and the like. In some implementations, the contact media (also referred to as a media bed) can be made of a filling material that provides a liquid/gas interface for the transfer of moisture from the supply airflow 10 (or the supply airflow 10a) to the liquid desiccant stream. In some implementations the contact media can be made of, for example, poly-ethylene, polypropylene, poly-vinyl-chloride, fiberglass, cellulose, or other suitable heat and mass transfer material and/or hygroscopic material. In some implementations, the contact media can be any random and/or structured packing (e.g., raschig rings, packings and the like), cellulose, designed to evenly distribute a liquid desiccant stream exposing it to an air flow (e.g., the supply airflow 10 or 10a). The fill material may be a weave that is formed into a mat, cylinder, or other shape.

The absorber 110 can expose the supply airflow 10 (or the supply airflow 10a) to the liquid desiccant stream to transfer moisture from the airflow 10 (or the supply airflow 10a) to the desiccant stream producing a diluted liquid desiccant stream which requires regeneration. The absorber 110 can be configured to recirculate a first portion and/or fraction of the diluted desiccant stream to the absorber and divert and/or send a second portion and/or fraction of the diluted liquid desiccant stream to the desorber 130 for regeneration (e.g., the diluted liquid desiccant 14 shown in FIG. 1). In some implementations, the diluted liquid desiccant 14 sent to the desorber 130 for regeneration, expressed as a percentage of the diluted liquid desiccant stream used to remove moisture from the supply airflow in the absorber 110 can be as low as about 1%, about 2%, about 3%, about 4%, about 5%, about 6%, about 7% about 8%, about 9%, about 10%, about 15%, about, 18% about, 20%, about 25%, about 30%, about 35%, about 40%, about 50%, about 60%, about 70%, about 75%, inclusive of all values and ranges therebetween.

The desorber 130 can be any suitable component that receives the diluted liquid desiccant 14 and provides a liquid/gas interface to expose the diluted liquid desiccant 14 to a regeneration stream 15 and remove water and/or moisture from the diluted liquid desiccant 14 (e.g., reconditioning the liquid desiccant for further processing in the absorber 110). The desorber 130 can include a housing, a plurality of inlet and outlet ports, a distributor component 140, and a contact media. The housing of the desorber 130 can be similar to and/or the same as the housing of the absorber 110. For example, the housing of the desorber 130 can be any suitable enclosure that defines at least one internal volume and/or chamber for accommodating one or more components of the desorber 130. The housing can be any suitable size and shape. For example, in some implementations the housing can be a cylindrical shape defined by a length and a circular cross-sectional area. In other implementations the housing can be a three-dimensional shape defined by a length and a suitable cross-sectional area such as a square, oval, ellipse, hexagon, heptagon, octagon, or any suitable polygon shape. In some implementations the housing can be a shape selected to maximize an interior volume for housing and/or accommodating the distributor component, the contact media and/or other components of the desorber 130, while minimizing the desorber 130 footprint (e.g., the external area and/or volume occupied by the desorber 130). The housing of the desorber 130 can be made out of any suitable material having sufficient rigidity, and resistance to degradation due to exposure to the liquid desiccant stream and/or other species present during conditioning of the diluted liquid desiccant 14. For example, in some implementations the housing of the desorber 130 can be made of and/or include metals, metal alloys, polymers, and/or composite materials including, but not limited to iron, nickel cobalt, aluminum, steel, copper, chrome, polyethylene, polyvinyl chloride, polycarbonates, poly(methyl methacrylate), fiberglass, and/or any other suitable material. In some implementations, the material forming the housing can be coated with a protective coating to reduce unwanted degradation and/or corrosion (e.g., an anti-corrosion coating), which can potentially cause affect the structural integrity of the housing or cause leaks of the liquid desiccant 14, the concentrated liquid desiccant 15, the regeneration stream, the exhaust stream, and/or contact media over time.

The desorber 130 can include a plurality of inlet and outlet ports designed to receive and flow the regeneration stream 12 (or the regeneration stream 12a) as well as the diluted liquid desiccant 14 within the desorber 130. In some implementations the desorber 130 can include at least one gas inlet port and one gas outlet port that allow flowing the regeneration stream 12 (or the regeneration stream 12a) within the desorber 130. The desorber 130 can also include at least one liquid inlet port and one liquid outlet port that allow flowing the liquid desiccant within the desorber 130. In some implementations, the desorber 130 can include a liquid inlet port configured to receive the diluted liquid desiccant 14 and transport the diluted liquid desiccant 14 to the distributor component 140. In other implementations, the distributor component 140 can be directly coupled to a liquid outlet port of the absorber 110 to receive the diluted liquid desiccant 14 (e.g., the distributor component 140 is fluidically coupled to the liquid outlet port of the absorber 110). The desorber 130 can also include a liquid outlet port that allows flowing the concentrated liquid desiccant 15 from the desorber 130 to the absorber 110, as shown in FIG. 1. In some implementations the desorber 130 can also include multiple inlet and outlet ports (auxiliary ports) for flowing any suitable number of auxiliary streams required for regenerating the diluted liquid desiccant 14 (e.g., steam, a heating gas stream, a heating fluid, or the like).

In some implementations the gas inlet and outlet ports, the liquid inlet and outlet ports, and the auxiliary ports of the desorber 130 can be directly disposed and/or coupled to a surface of the housing of the desorber 130. In some implementations, the gas inlet and outlet ports, the liquid inlet and outlet ports, and/or the auxiliary ports of the desorber 130 can be included and/or disposed on a manifold. The manifold can be coupled to the housing of the desorber 130 at any suitable location. In some implementations in which the distributor component 140 is directly coupled to a liquid outlet port of the absorber 110 to receive and flow the diluted liquid desiccant 14, the manifold of the desorber 130 can be sized and configured to receive and flow the regeneration stream 12 (or the regeneration stream 12a) within the desorber 130. The manifold can also include at least one liquid outlet port fluidically coupled to the absorber 110 to send and/or direct the concentrated liquid desiccant 15 produced in the desorber 130 back to the absorber 110. Alternatively, in some implementations in which the desorber 130 includes a liquid inlet port configured to receive the diluted liquid desiccant 14 and transport the diluted liquid desiccant 14 to the distributor component 140, the manifold can include such liquid inlet port. As described above, the manifold can also include any suitable number of auxiliary ports for flowing auxiliary streams required for regenerating the diluted liquid desiccant 14. In some implementations, the auxiliary ports can be disposed on a separate manifold. In some implementations, the desorber 130 can also include any additional components and/or accessories that facilitate flowing the regeneration stream 12 (or the regeneration stream 12a), and the diluted liquid desiccant 14 within the housing, such as for example, valves, fittings, unions, couplings derivations, splitters, gauges, sensors, and the like.

The distributor component 140 any suitable component that receives the diluted liquid desiccant 14 from the absorber 110 and emits, directs, flows, distributes, and/or dispenses an ultra-low flow of the diluted liquid desiccant 14 to the contact media of the desorber 130 for regeneration. As disclosed above, use of low and/or ultra-low liquid desiccant flow rates in a conditioning system, particularly on the regeneration side of the conditioning system, can reduce the heat/energy loads of the system, leading to increased energy efficiencies. However, the use of low or ultra-low flow rates of liquid desiccant introduces significant challenges such as distributing a slowly flowing liquid desiccant across the absorber/regenerator to allow effective and efficient moisture removal; and preventing or minimizing carryover of the liquid desiccant into the airstream to circumvent and/or prevent corrosion problems. The distributor component 140 can address all these challenges by ensuring the continuous and uniform delivery of a precisely controlled ultra-low flowrate of the diluted liquid desiccant 14 which is sufficient to wet and/or impregnate a large majority and/or substantially all of the contact media in the desorber 130.

The distributor component 140 facilitates emitting, directing, flowing, distributing, and/or dispensing the precisely controlled flowrate of the diluted liquid desiccant 14 independent of variations and/or changes caused by various factors including, for example, fluctuations in the hydrodynamic pressure in the absorber 110, and/or any other component of the ultra-low LD system 100, large changes and/or gradients of viscosity of the diluted liquid desiccant 14 caused by changes in the temperature of the diluted liquid desiccant 14 or the concentration of at least one desiccant salt present in the diluted liquid desiccant 14. The distributor component 140 allows fine tuning the flowrate of diluted liquid desiccant 14 such that is sufficient to wet and/or impregnate a large majority and/or substantially all of the contact media in the desorber 130 (e.g., achieving an effective distribution of liquid desiccant). The distributor component 140 also allows dispensing the liquid desiccant while reducing, minimizing and/or preventing carryover of the desiccant into the regeneration stream 12 (e.g., due to sputtering and/or spilling).

The distributor component 140 can include an inlet, a conduit, and one or more emitters or pressure compensated emitters. The inlet can be configured to receive a flow of liquid desiccant from an absorber such as the diluted liquid desiccant 14 shown in FIG. 1. In some embodiments, the inlet of the distributor 140 can be fluidically coupled to at least one liquid outlet port of the absorber 110 to receive the diluted liquid desiccant (e.g., the diluted liquid desiccant 14). In some implementations, the inlet of the distributor component 140 can be disposed on a manifold of the desorber 130. In other implementations, the inlet of the distributor component 140 can be self-standing (e.g., not coupled and/or secured to a manifold). The inlet of the distributor component 140 is fluidically coupled or in fluidic communication with the conduit. The conduit of the distributor component 140 can be a tube, hose, duct, line, pipe that can be used to receive and flow the diluted liquid desiccant 14 from the absorber 110. The conduit can be made of any suitable material having sufficient resistance to degradation caused by exposure to one or more highly corrosive component(s) of the diluted liquid desiccant 14. For example, in some implementations the conduit be made of and/or include metals, metal alloys, polymers, and/or composite materials including, but not limited to, iron, nickel, cobalt, aluminum, steel, copper, chrome, polyethylene, polyvinyl chloride, polycarbonates, poly(methyl methacrylate), fiberglass, and the like. In some implementations, the conduit can be coated with a protective coating to reduce unwanted degradation and/or corrosion (e.g., an anti-corrosion coating). In some implementations the conduit of the distributor component 140 can be a flexible material (e.g., a material that can be bend and/or re-shaped such as a plastic hosing or tubing). In other implementations, the conduit of the distributor component 140 can be a rigid pipe and/or duct made of metals, polymers, metal oxides and/or a combination thereof.

The distributor component 140, and more specifically, the conduit of the distributor component 140, can be disposed on any suitable portion and/or section of the desorber 130. In some embodiments, the specific arrangement of the distributor component 140 on the desorber (e.g., position within the desorber, geometry, dimensions, and the like) can have an impact on the ability of the system to reduce, minimize, and/or prevent carryover of liquid desiccant. In some implementations the conduit of the distributor component 140 can be disposed on an end-portion of the desorber 130. More specifically, in some embodiments the conduit of the distributor component 140 can be disposed don a top end-portion of the desorber 130, which is located away (e.g., opposite) to the ground and/or a horizontal surface in which the ultra-low LD system is disposed on. In some implementations the conduit of the distributor component 140 can be disposed on a bottom end-portion of the desorber 130, which is located adjacent to the ground and/or a horizontal surface in which the ultra-low LD system is disposed. In some implementations, the conduit of the distributor component 140 can be disposed in multiple regions and/or portions of the desorber 130. For example, the conduit of the distributor component 140 can have a first portion and/or section disposed on a bottom end-portion of the desorber 130, a plurality of portions disposed within the desorber 130 over the first portion and/or section and stacked at predetermined distances from the first portion and/or section. For example, the plurality of portions can be successively stacked over the first portion and/or section at a predetermined distance (e.g., a distance "A"). That is, starting from the bottom of the desorber 130, each portion of the conduit is stack every "A" length apart. In yet other implementations, the conduit of the distributor component 140 can be disposed within the desorber 130 in a random arrangement, pattern, and/or distribution. In some implementations, the conduit of the distributor component 140 can be a single tube, tube, hose, duct, line, pipe comprising two opposite end portions: a first end portion coupled to the inlet of the distributor component 140, and a second end portion that is sealed. In some implementations, the conduit of the distributor component 140 can be a closed loop coupled to the inlet. In other implementations, the conduit can comprise multiple sections (e.g., derivations and/or branches) distributed in a parallel/series configuration within the desorber 130, as further described herein.

The emitters or pressure compensated emitters of the distributor component 140 can be one or more devices and/or structure that allows emitting, directing, flowing, distributing, and/or dispensing one or more streams of the diluted liquid desiccant 14 from the conduit to the contact media of the desorber 130 at an ultra-low flowrate o. The emitters or pressure compensated emitters, which can also be referred to as "drip emitters" and/or "emitters" can be and/or include one or more orifices disposed on the conduit of the distributor component 140 according to a predetermined arrangement and/or layout. The predetermined arrangement and/or layout of emitters facilitates distributing the ultra-low flow of diluted liquid desiccant 14 to wet and/or impregnate a large majority and/or substantially all of the contact media in the desorber 130, as further described herein.

The distributor component 140 allows emitting, directing, flowing, distributing, and/or dispensing an ultra-low flowrate of the diluted liquid desiccant 14 from the conduit to the contact media of the desorber 130. In some implementations the ultra-low flowrate of the diluted liquid desiccant 14 can be a predetermined number of times smaller than the flow rate of the regeneration stream 12 (or the regeneration stream 12a). Said in other words, the regeneration stream 12 (or the regeneration stream 12a) can be flown at a mass flow rate value that is a predetermined number of times larger than the mass flow rate value of diluted liquid desiccant 14 emitted, directed, flown, distributed, and/or dispensed by distributor component 140. For example, in some implementations the predetermined number of times that the regeneration stream 12 (or the regeneration stream 12a) mass flow rate value is larger than the mass flow rate value of the diluted liquid desiccant 14 dispensed by the distributor component 140 can be at least about 30 times, about 40 times, about 50 times, about 60 times, about 70 times, about 80 times, about 90 times, about 100 times, about 110 times, about 120 times, about 130 times, about 140 times, or about 150 times, inclusive of all values and ranges therebetween.

As described above, the removal of moisture (e.g., the regeneration) of the diluted liquid desiccant 14 with the regeneration stream 12 at ultra-low flow rates of diluted liquid desiccant 14 can result in large changes of concentration of at least one salt present in the diluted liquid desiccant 14. For example, in some implementations the concentration of a salt present in the diluted liquid desiccant 14 (or a diluted liquid desiccant stream entering the regenerator 130) can be a first salt concentration in weight percentage (wt. %), while the concentration of that salt present in the concentrated liquid desiccant 15 can be a second salt concentration in weight percentage (wt. %). In some embodiments the difference between the first and the second salt concentration is at least about 2.0 wt. %, about 3.0 wt. %, about 3.5 wt. %, about 4.0 wt. %, about 4.5 wt. %, about 5.0 wt. %, about 5.5 wt. %, about 6 wt. %, about 6.5 wt. %, about 7.0 wt. %, about 7.5 wt. %, about 8.0 wt. %, about 8.5 wt. %, about 9.0 wt. %, about 9.5 wt. %, about 10 wt. %, about 11 wt. %, about 12 wt. %, about 13 wt. %, about 14 wt. %, or about 15 wt. %, inclusive of all values and ranges therebetween.

As disclosed above, the desorber 130 can also include a contact media used to facilitate the contacting of the regeneration stream 12 (or the regeneration stream 12a) with the diluted liquid desiccant 14. The contact media of the desorber 130 can be disposed in the at least one interior volume, chamber, and/or compartment defined by the housing of the desorber 130. The contact media can be and/or include any suitable vapor/liquid mass transport unit operation component such as, for example, one or more packed beds, tray towers, spray towers, bubble columns, membranes, and the like. In some implementations, the contact media (also referred to as a media bed) can be made of a filling material that provides a liquid/gas interface for the transfer of moisture from the diluted liquid desiccant 14 to the regeneration stream 12 (or the regeneration stream 12a). In some implementations the contact media can be made of, for example, poly-ethylene, polypropylene, poly-vinyl-chloride, fiberglass, cellulose, or other suitable heat and mass transfer material and/or hygroscopic material. In some implementations, the contact media can be any random and/or structured packing (e.g., raschig rings, packings and the like), cellulose, designed to evenly distribute a liquid desiccant stream exposing it to an air flow (e.g., the supply airflow 10 or 10a). The fill material may be a weave that is formed into a mat, cylinder, or other shape. In some embodiments, the concentrated liquid desiccant 15 can have a temperature and a humidity ratio (measured in kg of water per kg of stream, or kg/kg, at the liquid outlet port of the absorber 130) that approaches equilibrium with the regeneration stream 12 (or the regeneration stream 12a) entering the desorber 130. In other embodiments, the concentrated liquid desiccant 15 can have a temperature and a humidity ratio (measured at the liquid outlet port of the absorber 130) that approaches within 2° C. and 0.002 kg/kg the temperature and humidity ratio of the regeneration stream 12 (or the regeneration stream 12a) entering the desorber 130. In yet other embodiments, the concentrated liquid desiccant 15 can have a temperature and a water vapor pressure (measured at the liquid outlet port of the absorber 130) that approaches within 5° C. and 0.005 kg/kg the temperature and humidity ratio of the regeneration stream 12 (or the regeneration stream 12a) entering the desorber 130.

The heat exchanger 150 can be any suitable heat exchange device and/or component configured to transfer heat to the regeneration stream 12 to produce the regeneration stream 12a. The heat exchanger 150 may include a condenser coil configured to add heat to the regeneration stream 12. Heated regeneration stream 12a can then enter the desorber 130 to both heat the diluted liquid desiccant 14 and transfer moisture from the diluted liquid desiccant 14 to the heated regeneration stream 12a at the desorber liquid/air interface. The heat exchanger 150 may be any useful heat source unit operation that provides heat to the desorber 130 such as, electric heat, gas-fired heat, solar heat, geothermal heat, condenser coil, and the like. In some embodiments, the regeneration stream 12a entering the desorber 130 to regenerate the liquid desiccant 14 can be flown at a predetermined temperature of at least about 65° F., at least about 80° F., at least about 90° F., at least about 95° F., at least about 100° F., at least about 110° F., at least about 120° F., or at least about 130° F., inclusive of all values and ranges therein. In some embodiments, the regeneration stream 12a entering the desorber 130 to regenerate the liquid desiccant 14 can be flown at a predetermined temperature and/or a predetermined humidity. For example, in some embodiments the regeneration stream 12a entering the desorber 130 can be flown at a predetermined humidity (in kg of water content per kg of gas) of no more than about 0.050, no more than about 0.040, no more than about 0.030, no more than about 0.025, no more than about 0.020, no more than about 0.015, no more than about 0.010, or no more than about 0.005, inclusive of all values and ranges therebetween.

The heat exchanger 160 can be any suitable heat exchange device and/or component configured to transfer heat from the supply airflow 10 to produce a cooled supply airflow 10a. The heat exchanger 160 may be any useful heat sink unit operation that removes heat from the absorber 110. For example, the heat exchanger 160 can be a refrigerant-to-air condenser coil, chilled water coil, evaporative coolers, and the like. Cooled supply airflow 10a can then enter the absorber 110 to be exposed to a liquid desiccant stream, as described above.

FIG. 2 shows a table displaying the advantages of using a low-flow or ultra-low flow desiccant rate. The first column in FIG. 2 shows the typical ratio of mass flow of air to mass flow of desiccant expressed in dimensionless units. The second column shows the liquid desiccant flow rate required for regeneration in mL/min; rates under 2,000 mL/min can be considered low or ultra-low flow rates. The first advantage of using low or ultra-low flow rates is demonstrated in the second and third columns in FIG. 2. As that desiccant must be transported to the relatively colder absorber to be used for moisture collection it will transport heat to the conditioned air (e.g., heat transported to the process airstream). The resulting heat flow expressed in watts is shown in the second column while the impact to system efficiency is shown in the third column: the heat transported and resulting efficiency loss is much lower for low-flow and ultra-low flow desiccant systems. The second advantage is summarized in columns four and five in FIG. 2. Regenerating the desiccant requires both a quantity of air to absorb and transport away the moisture rejected by the desiccant and a quantity of heat to heat both the air and the liquid desiccant. Column four shows the airflow rate needed in cubic feet per minute (CFM) while column five shows the heat required to complete regeneration if the air begins at, for example 70 Fahrenheit. The advantages of low or ultra-low flow desiccants, requiring lower airflow and less heat, are readily apparent in this table. It is noteworthy that many desiccant systems lack sufficient heat to regenerate in a variety of working conditions: low-flow and ultra-low flow desiccant systems overcome this significant limitation. In some embodiments, the systems and devices described herein can be configured to flow an ultra-low flow rate of liquid desiccant such that the system minimizes the amount of heat required for regenerating the liquid desiccant to no more than about 50 KW, no more than about 40 kW, no more than about 30 KW, no more than about 20 kW, no more than about 18 KW, no more than about 16 KW, no more than about 14 kW, no more than about 12 kW, no more than about 10 KW, no more than about 8 kW, no more than about 6 KW, no more than about 4 kW, no more than about 2 KW, no more than 1 kW, or no more than about 0.5 kW, inclusive of all values and ranges therebetween. In some embodiments, the systems and devices described herein can be configured such that the liquid desiccant transports heat to the process air stream (e.g., heat transfer to a supply airflow) resulting in a reduction in the efficiency of the system of no more than about 5%, no more than about 4%, no more than about 3%, no more than about 2%, no more than about 1%, no more than about 0.8%, no more than about 0.6%, no more than about 0.4%, or no more than about 0.2%, inclusive of all values and ranges therein.

Figure 3:
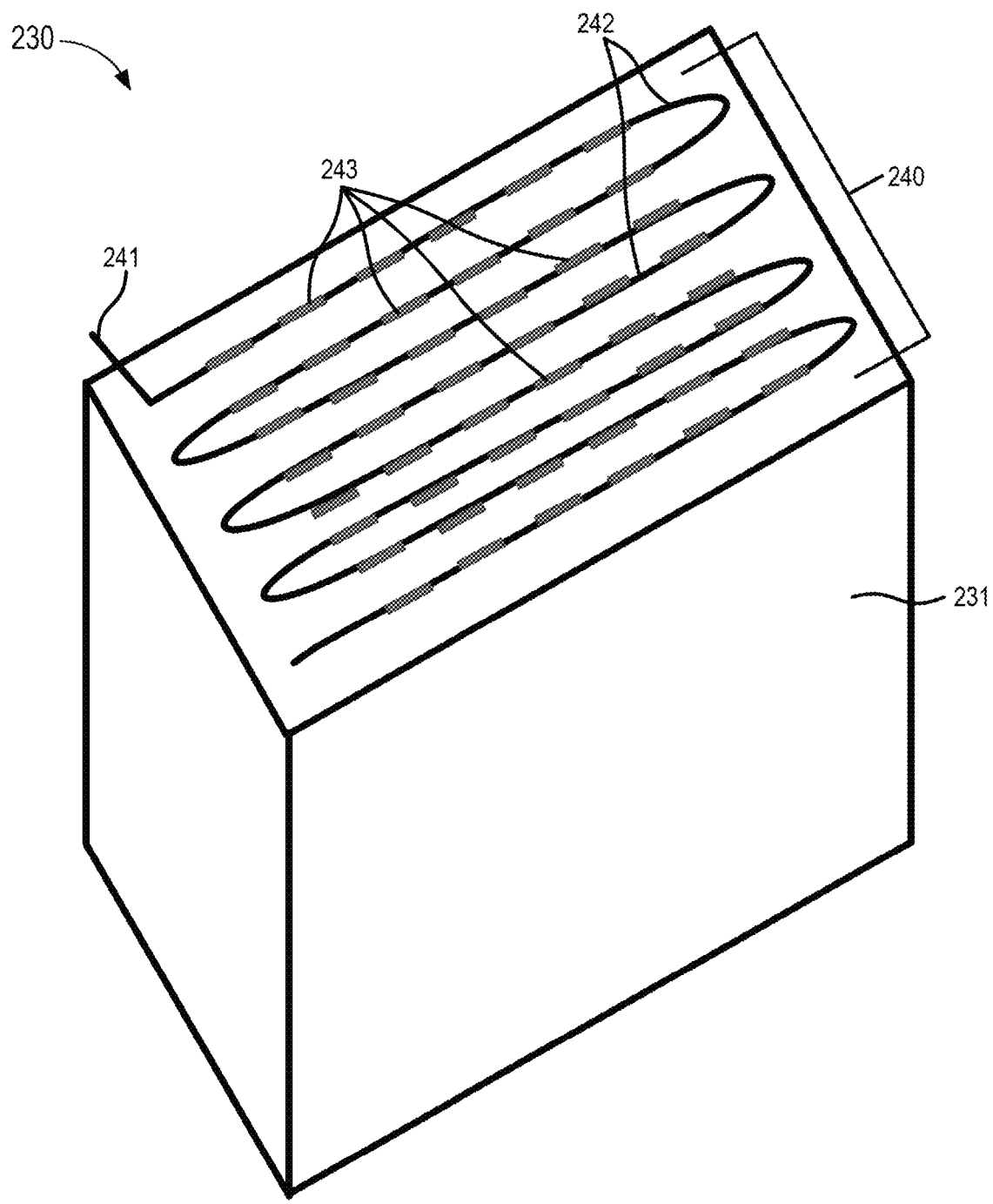
FIG. 3 is a schematic illustration perspective view of a desorber unit for the regeneration of a liquid desiccant, according to an embodiment.

FIG. 3 shows a schematic illustration perspective view of a desorber 230 for the regeneration of a liquid desiccant, according to an embodiment. The desorber 230 can be similar to the desorber 130 described above. For example, the desorber unit 230 can include a housing 231, a distributor component 240, and a contact media (not shown in FIG. 3), similar to the housing, the distributor component 140, and the contact media described above with reference to the desorber 130 of the ultra-low flow LD system 100. The housing 231 of the desorber 230 can be an enclosure that defines at least one internal volume and/or chamber for accommodating one or more components of the desorber 230. The housing 231 can be any suitable size and shape. For example, in some implementations the housing 231 can be a cylindrical shape defined by a length and a circular cross-sectional area. In other implementations the housing 231 can be a three-dimensional shape defined by a length and a suitable cross-sectional area such as a square, oval, ellipse, hexagon, heptagon, octagon, or any suitable polygon shape. In some implementations the housing 231 can be a shape selected to maximize an interior volume for housing and/or accommodating the distributor component, the contact media and/or other components of the desorber 230, while minimizing the desorber 230 footprint (e.g., the external area and/or volume occupied by the desorber 230). The housing 231 of the desorber 230 can be made out of any suitable material having sufficient rigidity, and resistance to degradation due to exposure to the liquid desiccant stream and/or other species present during conditioning of a diluted liquid desiccant. For example, in some implementations the housing of the desorber 230 can be made of and/or include metals, metal alloys, polymers, and/or composite materials including, but not limited to iron, nickel cobalt, aluminum, steel, copper, chrome, polyethylene, polyvinyl chloride, polycarbonates, poly(methyl methacrylate), fiberglass, and/or any other suitable material. In some implementations, the material forming the housing 231 can be coated with a protective coating to reduce unwanted degradation and/or corrosion (e.g., an anti-corrosion coating), which can potentially cause affect the structural integrity of the housing or cause leaks of liquid desiccant, contact media and/or a gas stream.

The distributor component 240 can be any suitable component configured to receive a diluted liquid desiccant from an absorber, and emit, direct, flow, distribute, and/or dispense an ultra-low flow of the diluted liquid desiccant to the contact media of the desorber 230 for regeneration. FIG. 3 shows the distributor component 240 is disposed on a cross sectional area of the desorber 230. The distributor component 240 can include an inlet 241, a conduit 242, and a plurality of emitters 243 disposed along the conduit 242. The inlet 241 can be configured to receive a flow of liquid desiccant from an absorber. In some implementations, as shown in FIG. 3, the inlet 241 can be coupled to the housing 231. In other implementations, the inlet 241 can be disposed on a manifold of the desorber 230. Alternatively, in some implementations the inlet 241 can be self-standing (e.g., not coupled and/or secured to a manifold). The inlet 241 is fluidically coupled or in fluidic communication with the conduit 242.

The conduit 242 of the distributor component 240 can be a tube, hose, duct, line, pipe that can be used to receive and flow a diluted liquid desiccant from an absorber. The conduit 242 can be made of any suitable material having sufficient resistance to degradation caused by exposure to one or more highly corrosive component(s) of the diluted liquid desiccant. For example, in some implementations the conduit be made of and/or include metals, metal alloys, polymers, and/or composite materials including, but not limited to, iron, nickel, cobalt, aluminum, steel, copper, chrome, polyethylene, polyvinyl chloride, polycarbonates, poly(methyl methacrylate), fiberglass, and the like. In some implementations, the conduit 242 can be coated with a protective coating to reduce unwanted degradation and/or corrosion (e.g., an anti-corrosion coating). In some implementations the conduit 242 can be and/or include a flexible material (e.g., a material that can be bend and/or re-shaped such as a plastic hosing or tubing). In other implementations, the conduit 242 can be a rigid pipe and/or duct made of metals, polymers, metal oxides and/or a combination thereof. The conduit 242 includes a single tube disposed along a cross sectional area of the desorber 230 according to any suitable pattern. For example, as shown in FIG. 3, the conduit 242 can be disposed according to an "s-shaped" pattern distributed along a cross sectional area of the desorber 230. In other embodiments, the conduit can be disposed according to other suitable patterns such as a spiral pattern, wave-like pattern, a concentric circles pattern, or the like. The conduit 242 includes a plurality of emitters 243 disposed in series along the length of the conduit 242. The emitters 243 can be disposed at specific distances with respect to the inlet 241, such that the emitters collectively distribute a low and/or ultra-low flow of liquid desiccant to the contact media in the desorber.

Figure 4:
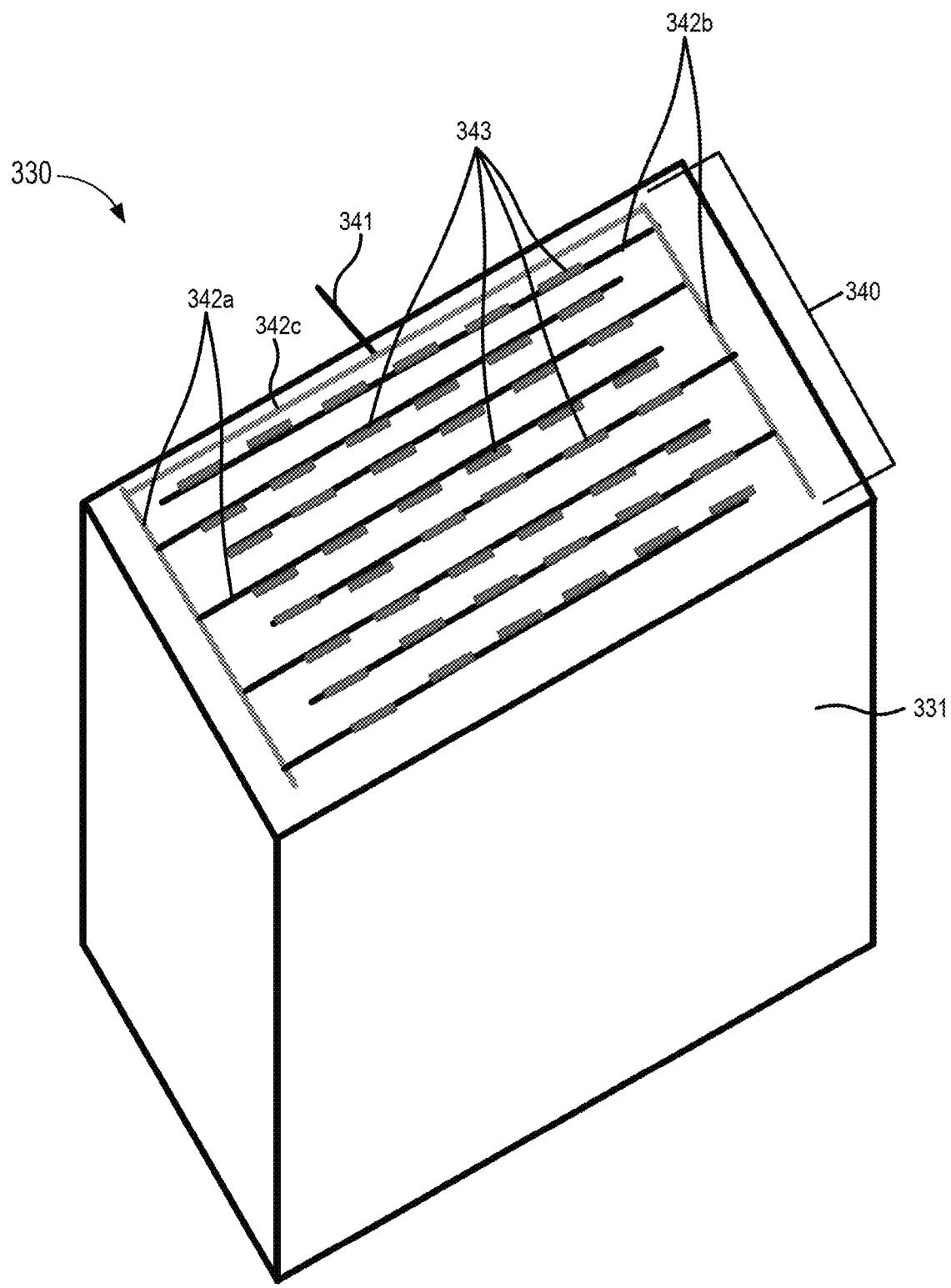
FIG. 4 is a schematic illustration perspective view of a desorber unit for the regeneration of a liquid desiccant, according to an embodiment.

FIG. 4 shows a schematic illustration perspective view of a desorber 330 for the regeneration of a liquid desiccant, according to an embodiment. The desorber 330 can be similar to the desorber 130, and/or the desorber 230 described above. For example, the desorber unit 330 can include a housing 331, a distributor component 340, and a contact media (not shown in FIG. 4), similar to the housing, the distributor component, and the contact media described above with reference to the desorber 130 of the ultra-low flow LD system 100. Portions and/or aspects of the desorber 330 can be similar to and/or substantially the same as portions and/or aspects of the desorber 130 described above with reference to FIG. 1. Accordingly, such similar portions and/or aspects may not be described in further detail herein. FIG. 4 shows the distributor component 340 is disposed on a cross sectional area of the desorber 330. The distributor component 340 includes an inlet 341, a conduit 342 (e.g., a first conduit portion 342a, and a second conduit portion 342b), and a plurality of emitters 343 disposed on the first conduit portion 342a and the second conduit portion 342b. The inlet 341 can be configured to receive a flow of liquid desiccant from an absorber. The inlet 341 is fluidically coupled or in fluidic communication with the conduit 342.

The conduit 342 of the distributor component 340 can be a plurality of tubes, hoses, ducts, lines, pipes that can be used to receive and flow a diluted liquid desiccant from an absorber. The conduit 342 can be made of any suitable material having sufficient resistance to degradation caused by exposure to one or more highly corrosive component(s) of the diluted liquid desiccant. For example, in some implementations the conduit be made of and/or include metals, metal alloys, polymers, and/or composite materials including, but not limited to, iron, nickel, cobalt, aluminum, steel, copper, chrome, polyethylene, polyvinyl chloride, polycarbonates, poly(methyl methacrylate), fiberglass, and the like. The conduit 342 can include multiple tubes disposed in a parallel configuration. As shown in FIG. 4, the conduit 342 can include a first conduit portion 342a and a second conduit portion 342b fluidically coupled to a primary tube and/or line 342c. The first conduit portion 342a and the second conduit portion 342b can be arranged in a parallel configuration. In the parallel configuration, a fraction of the liquid desiccant flow received in the desorber 330 is directed from the inlet 341 to the first conduit portion 342a via the primary tube 342c, and the remaining flow of liquid desiccant received in the desorber 330 is directed from the inlet 341 to the second conduit portion 342b via the primary tube 342c.

FIG. 4 shows the inlet 341 is coupled to the primary tube 342c such that the flow of desiccant received in the desorber 340 is split into a first portion and/or fraction and a second portion and/or fraction. The first fraction of the flow of desiccant is directed by the primary tube 342c to the first conduit portion 342a. The first conduit portion 342a includes a series of side tubes and/or lines that distribute the flow of liquid desiccant into the contact media of the desorber 330. Similarly, the remaining flow of liquid desiccant is directed by the primary tube 342c to the second conduit portion 342b. The second conduit portion 342b includes a series of side tubes and/or lines that distribute the flow of liquid desiccant into the contact media of the desorber 330. As shown in FIG. 4, the side tubes of the first conduit portion 342a can be disposed substantially parallel to the side tubes of the second conduit portion, such that the side tubes collectively achieve an effective distribution of liquid desiccant on the contact media of the desorber 330. In some embodiments, the conduit 342 can include multiple conduit portions fluidically coupled to a primary tube and/or line. In such embodiments, the multiple conduit portions can be arranged in any suitable parallel and/or series configuration that allows achieving an effective distribution of liquid desiccant on the contact media included in the desorber 330.

Figure 5:
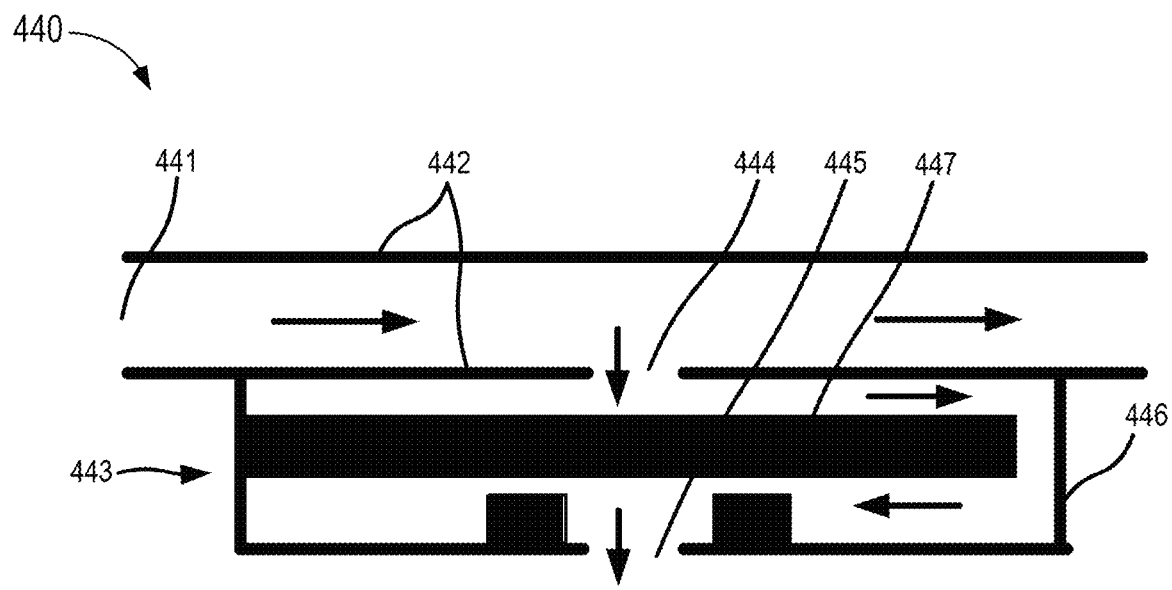
FIG. 5 is a cross sectional view schematic illustration of an emitter included in a distributor component, according to an embodiment.

FIG. 5 shows a cross sectional view schematic illustration of an emitter 443 included in a distributor component 440, according to an embodiment. The emitter 443 can be coupled to a conduit 442 configured to transport and/or direct liquid desiccant received on the distributor component 440. The emitter 443 can be and/or include any suitable components configured to deliver diluted liquid desiccant at a low and/or ultra-low flowrate, ensuring a precise control over the diluted liquid desiccant over a considerable range of pressures, temperatures, and concentration of one or more salts included in the diluted liquid desiccant. For example, the emitter 443 can include one or more components such as a casing and/or shell 446, a drip orifice 444, a drip emitter 445, and a diverter module 447. The casing and/or shell 446 of the emitter 440 can be any suitable enclosure that defines an internal volume and/or chamber for accommodating other components of the emitter 443. The casing and/or shell 446 of the emitter 443 can be any suitable size and shape. For example, in some implementations the casing 446 can be a three-dimensional shape defined by a substantially constant geometrical cross-sectional area and a height and/or depth. The cross-sectional area can be any suitable 2-D geometrical shape including a circle, an ellipse, a polygon or the like. Alternatively, the cross-sectional area can be an irregular shape. The casing 446 of the emitter (or emitters) 443 can be made out of any suitable material having sufficient rigidity, and resistance to degradation due to exposure to the liquid desiccant and/or any species present during regeneration of the diluted liquid desiccant. For example, in some implementations the casing 446 can be made of and/or include metals, metal alloys, polymers, and/or composite materials including, but not limited to iron, nickel cobalt, aluminum, steel, copper, chrome, polyethylene, polyvinyl chloride, polycarbonates, poly(methyl methacrylate), fiberglass, and/or any other suitable material. In some implementations, the material forming the casing 446 can be coated with a protective coating to reduce unwanted degradation and/or corrosion (e.g., an anti-corrosion coating). In some implementations the emitters 443 can be disposed on an external surface of the conduit 442 as shown in FIG. 5.

The casing of the emitter 443 can include at least one drip orifice 444 and at least one drip emitter 445. The drip orifice 444 can be an opening, aperture, hole, slot, vent, fissure, cranny, or the like, disposed on a first portion and/or surface of the casing of the emitter 443. The drip orifice 444 fluidically couples the conduit 442 with the emitter 443 such that emitter 443 can receive diluted liquid desiccant within its casing 446. The drip emitter 445 can be an opening, aperture, hole, slot, vent, fissure, cranny, or the like, disposed on a second portion and/or surface of the casing of the emitter 443, different from the first portion. The drip emitter 445 can be used to direct, flow, distribute, and/or dispense the precisely controlled flow of the diluted liquid desiccant towards the contact media in a desorber. The diverter module 447 can be any suitable component that provides a tortuous path for the diluted liquid desiccant from the conduit 442 to the contact media in the desorber. The components of the emitters 443 (e.g., the drip orifice 444, the emitter orifice 445, and the diverter module 447) collectively provide a substantially constant flow rate and relatively high pressure drop as compared to the conduit 442 independent of the diluted liquid desiccant pressure once a certain critical inlet pressure has been achieved. Below the critical pressure, the flow rate increases proportionally to the inlet pressure. Above the critical pressure the flow rate is almost constant and independent of the pressure.

Figure 6:
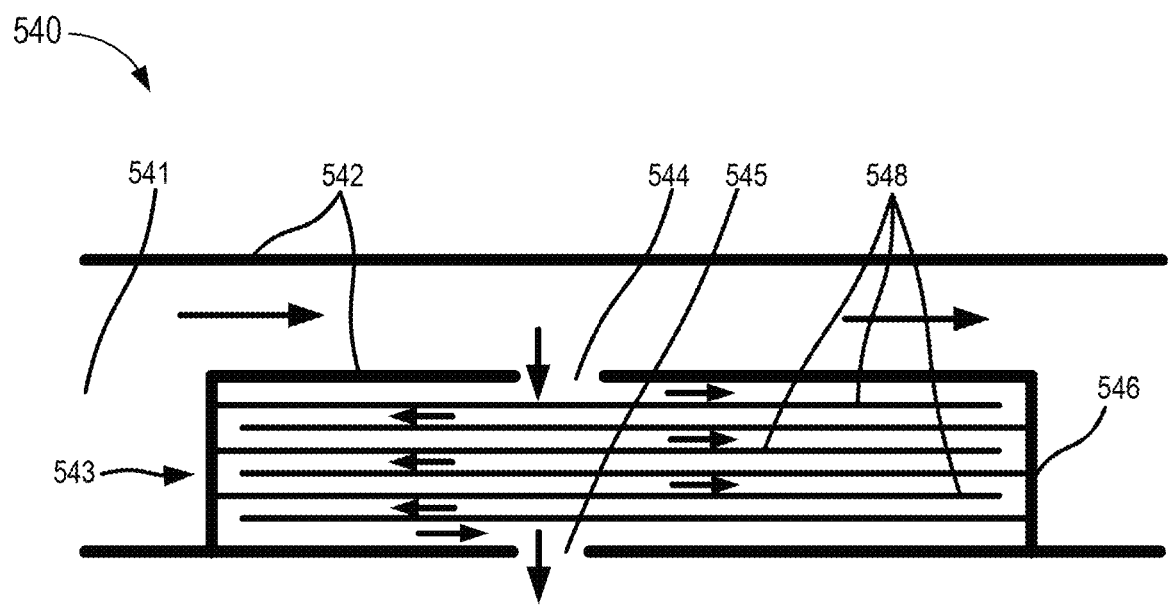
FIG. 6 is a cross sectional view schematic illustration of an emitter included in a distributor component, according to an embodiment.

FIG. 6 shows a cross sectional view schematic illustration of an emitter 543 included in a distributor component 540, according to an embodiment. The emitter 543 can be coupled to a conduit 542 configured to transport and/or direct liquid desiccant received on the distributor component 540. The emitter 543 can be and/or include any suitable components configured to deliver diluted liquid desiccant at a low and/or ultra-low flowrate, ensuring a precise control over the diluted liquid desiccant over a considerable range of pressures, temperatures, and concentration of one or more salts included in the diluted liquid desiccant. For example, the emitter 543 can include one or more components such as a casing and/or shell 546, a drip orifice 544, a drip emitter 545, and a labyrinthine pathway 548. The casing and/or shell 546 of the emitter 540 can be any suitable enclosure that defines an internal volume and/or chamber for accommodating other components of the emitter 543. The casing and/or shell 546 of the emitter 543 can be any suitable size and shape. For example, in some implementations the casing 546 can be a three-dimensional shape defined by a substantially constant geometrical cross-sectional area and a height and/or depth. The cross-sectional area can be any suitable 2-D geometrical shape including a circle, an ellipse, a polygon or the like. Alternatively, the cross-sectional area can be an irregular shape. The casing 546 of the emitter (or emitters) 543 can be made out of any suitable material having sufficient rigidity, and resistance to degradation due to exposure to the liquid desiccant and/or any species present during regeneration of the diluted liquid desiccant. For example, in some implementations the casing 546 can be made of and/or include metals, metal alloys, polymers, and/or composite materials including, but not limited to iron, nickel cobalt, aluminum, steel, copper, chrome, polyethylene, polyvinyl chloride, polycarbonates, poly(methyl methacrylate), fiberglass, and/or any other suitable material. In some implementations, the material forming the casing 546 can be coated with a protective coating to reduce unwanted degradation and/or corrosion (e.g., an anti-corrosion coating.

The casing of the emitter 543 can include at least one drip orifice 544 and at least one drip emitter 545. The drip orifice 544 can be an opening, aperture, hole, slot, vent, fissure, cranny, or the like, disposed on a first portion and/or surface of the casing of the emitter 543. The drip orifice 544 fluidically couples the conduit 542 with the emitter 543 such that emitter 543 can receive diluted liquid desiccant within its casing 546. The drip emitter 545 can be an opening, aperture, hole, slot, vent, fissure, cranny, or the like, disposed on a second portion and/or surface of the casing of the emitter 543, different from the first portion. The drip emitter 545 can be used to direct, flow, distribute, and/or dispense the precisely controlled flow of the diluted liquid desiccant towards the contact media in a desorber. The labyrinthine pathway 548 can be any suitable pathway that provides a tortuous path for the diluted liquid desiccant from the conduit 542 to the contact media in the desorber. The components of the emitters 543 (e.g., the drip orifice 544, the emitter orifice 545, and the labyrinthine pathway 548) collectively provide a substantially constant flow rate and relatively high pressure drop as compared to the conduit 542 independent of the diluted liquid desiccant pressure once a certain critical inlet pressure has been achieved. The labyrinthine pathway can in some instance, be a complicated path that doubles back as shown in FIG. 6 or can be as simple as a single straight, sufficiently narrow pathway (e.g., a hole) that presents the required pressure drop. Below the critical pressure, the flow rate increases proportionally to the inlet pressure. Above the critical pressure the flow rate is almost constant and independent of the pressure.

Figure 7:
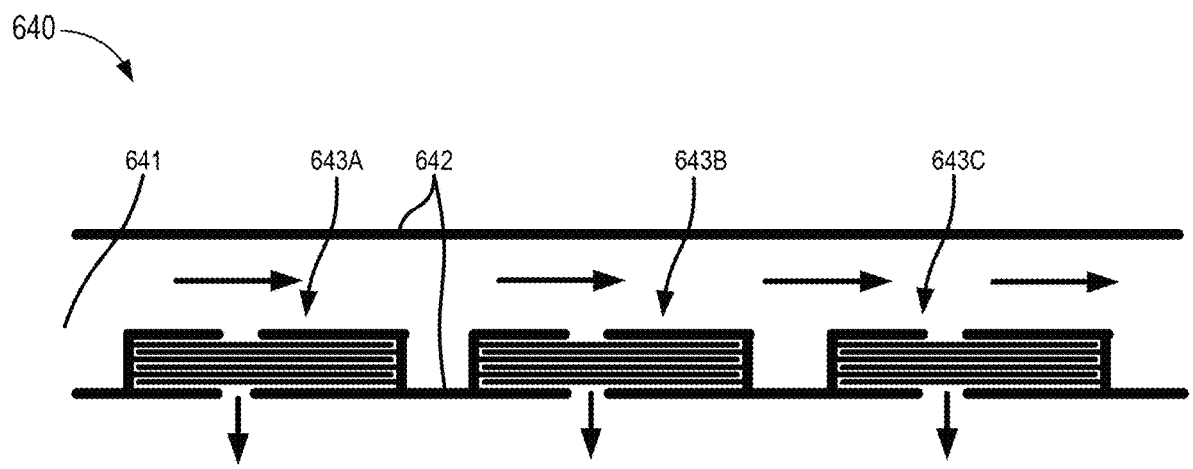
FIG. 7 is a cross sectional view schematic illustration of an array of emitters of a distributor component, according to an embodiment.

FIG. 7 shows a partial cross sectional view schematic illustration of a series of emitters (643A), (643B), and (643C) disposed in a conduit 642 of a distributor component 640 for transporting liquid desiccant to the series of emitters. Desiccant is introduced into the conduit 642 at the entrance and/or inlet 641 and exits through the orifices of the series of emitters 643. The conduit 642 terminates after a series of such emitters 643 thus forcing all desiccant to exit the conduit 642 through the series of emitters (643A), (643B), (643C).

Figure 8:
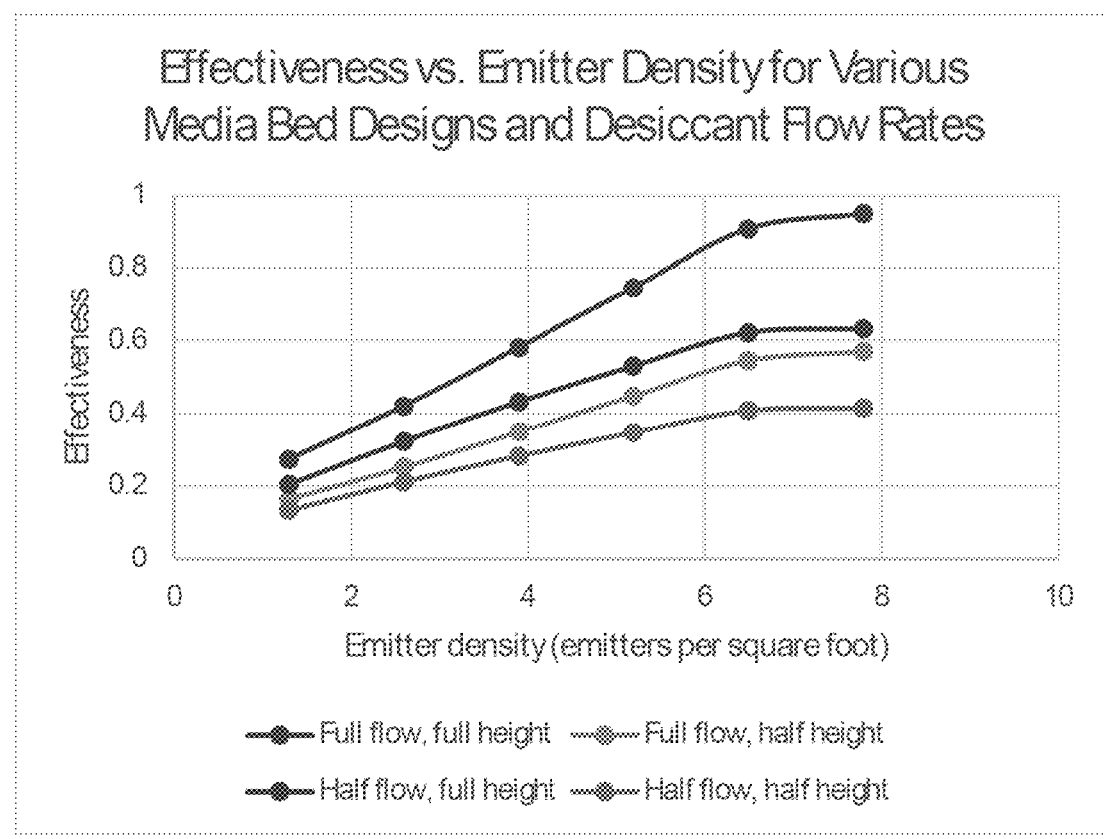
FIG. 8 is a graph displaying the effectiveness of a media bed as a function of the density of an array of emitters, recorded for two different media beds and two different flow rates.

FIG. 8 show a chart that depicts the effectiveness of the regenerator vs. the effective spacing density of the emitters for typical flow rates and media bed designs. For each flow rate and media bed design the effectiveness decreases from the maximum effectiveness possible (i.e., an effectiveness of 1.0) as the density decreases. The effectiveness also depends on the media bed design. FIG. 8 shows the curves generated for two exemplary media bed designs where at the same emitter spacing a first media bed, here labeled as "full height", is more effective than a second media bed, labeled as "half height". The differences in effectiveness between the first media bed and the second media bed stem from differences in the media bed material, such as its hydrophilicity, the geometry of the media bed, and/or the length of the media bed in the desiccant flow direction. FIG. 8 also shows that at different liquid desiccant flow rates the same media bed will support different effectiveness. In some embodiments, a conduit can include an array of emitters disposed on the conduit such that the spacing density of the emitters is at least about 0.5 emitter per square foot, at least about 1 emitter per square foot, at least about 2 emitters per square foot, at least about 3 emitters per square foot, at least about 4 emitters per square foot, at least about 5 emitters per square foot, at least about 6 emitters per square foot, at least about 7 emitters per square foot, at least about 8 emitters per square foot, at least about 9 emitters per square foot, at least about 10 emitters per square foot, at least about 12 emitters per square foot, or at least about 15 emitter per square foot, inclusive of all values and ranges therebetween. In some embodiments, the flow rate of the liquid desiccant in the desorber is selected to maximize the effectiveness of the desorber. For example, in some embodiments the mass flow rate of the liquid desiccant can be selected such that the effectiveness of the desorber is at least about 40%, at least about 45%, at least about 50%, at least about 55%, at least about 60%, at least about 65%, at least about 70%, at least about 75%, at least about 80%, at least about 85%, at least about 90%, or at least about 95%, inclusive of all values and ranges therebetween.

Figure 9:
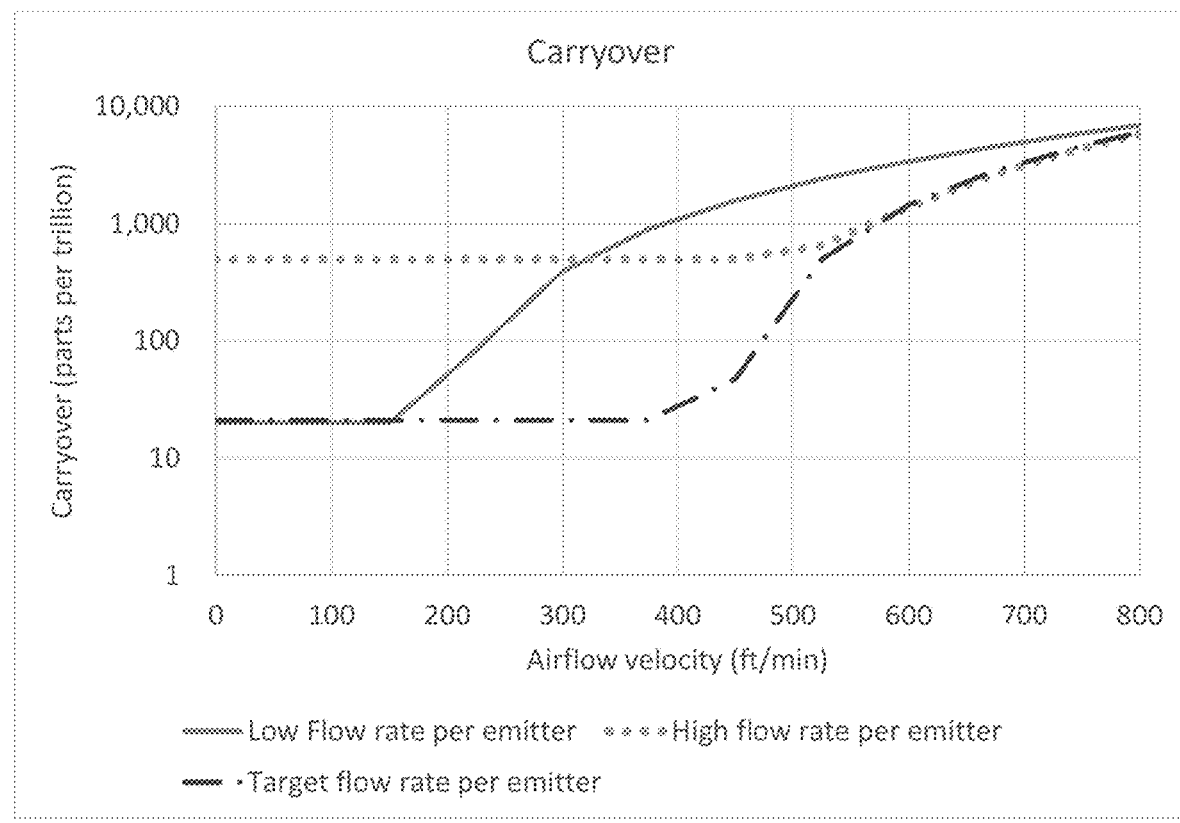
FIG. 9 is a graph displaying liquid desiccant carryover (in parts per trillion) as a function of air flow velocity for an array of emitters with four different spacings.

FIG. 9 shows the relationship between carryover, in parts per trillion of mass flow, vs. the airflow velocity for various desiccant flow rates. Carryover can be decreased to acceptable levels by decreasing the airflow velocity. However, decreasing the airflow velocity will reduce the amount of process air that the system can treat, thus the system's usefulness can be maximized by selecting an appropriate desiccant flow rate. As the desiccant flow rate per emitter decreases the amount of sputtering will increase causing an increase in carryover as shown by the low flow rate per emitter line. Carryover can be decreased by increasing to a sufficient level the desiccant flow rate per emitter. This rate per emitter can be increased to acceptable levels by either increasing the total desiccant flow rate or decreasing the number of emitters (i.e., decreasing the density of the emitter spacing). In order to keep the total desiccant flow rate in the low or ultra-low regime, this is best accomplished in some instances by decreasing the number of emitters by increasing the spacing per emitter. However, decreasing to too few emitters will increase the flow rate of the desiccant per emitter possibly causing "jetting" of the desiccant which, in turn, can form droplets as the jet collides with the media bed increase the carryover as shown in the "high flow rate per emitter" line.

Figure 10:
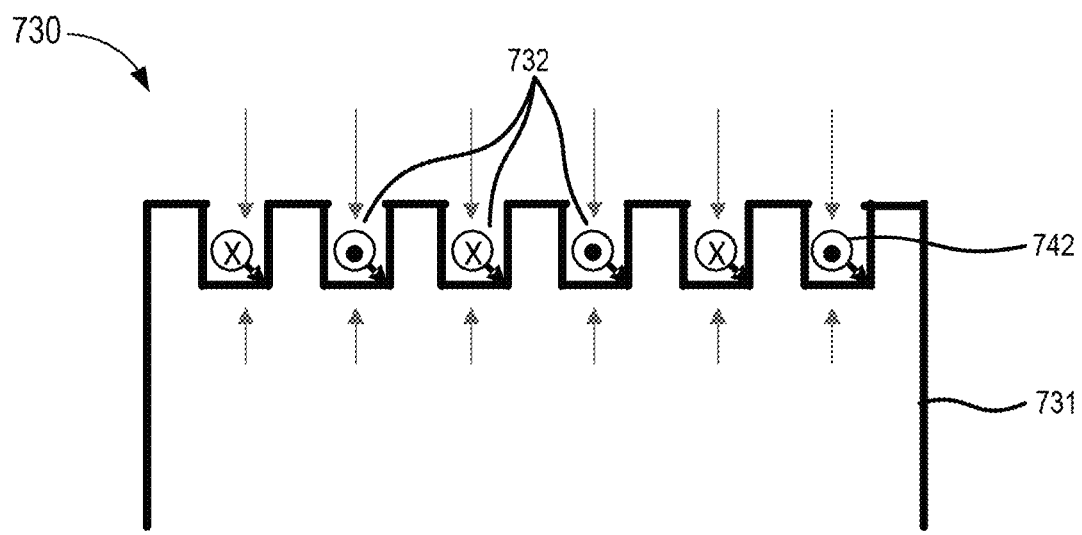
FIG. 10 is a cross sectional side view of a portion of the desorber unit shown in FIG. 3, displaying a trench design to accommodate a distributor component of the desorber unit, according to an embodiment.

FIG. 10 shows schematically a cross-sectional side view of a portion of a desorber 730, according to an embodiment. The desorber 730 can be similar to the desorber 130, 230, and/or the desorber 330 described above. For example, the desorber unit 730 can include a housing 731, a distributor component comprising a conduit 742 with a plurality of emitters (not shown in FIG. 10) and contact media (also not shown in FIG. 10), similar to the housing, distributor component, and the contact media described above with reference to the desorber 130 of the ultra-low flow LD system 100. Portions and/or aspects of the desorber 730 can be similar to and/or substantially the same as portions and/or aspects of the desorber 130 described above with reference to FIG. 1. Accordingly, such similar portions and/or aspects may not be described in further detail herein. FIG. 10 illustrates the concept of decreasing the likelihood of carryover by "trenching" or embedding the emitters in trenches 732 in the media bed of the desorber 730. One critical concept of this embodiment includes minimizing or eliminating any space between the emitters and the media bed so that as desiccant flows from the emitters it bonds to the media bed without becoming entrenched in the airstream as droplets or aerosols. Said another way, space between the emitters and the media bed can be reduced or minimized to increase or maximize bonding of the desiccant to the media bed and reducing or minimizing the amount of desiccant that may become entrenched in the airstream as droplets, aerosols, or the like.

FIG. 11 shows schematically a cross sectional side view of a portion of a desorber 830, according to an embodiment. The desorber 830 can be similar to the desorber 130, 230, 330 and/or the desorber 730 described above. For example, the desorber unit 830 can include a housing 831, a distributor component comprising a conduit 842, and contact media (not shown in FIG. 11), similar to the housing, distributor component, and the contact media described above with reference to the desorber 130 of the ultra-low flow LD system 100. Portions and/or aspects of the desorber 830 can be similar to and/or substantially the same as portions and/or aspects of the desorber 130 described above with reference to FIG. 1. Accordingly, such similar portions and/or aspects may not be described in further detail herein. FIG. 1 illustrates the concept of adding a top media bed 833 to the emitters embedded in trenches 832 to further reduce carryover. Enclosing the emitters in this manner has the effect of capturing any droplets or aerosols that are formed in the desiccant's transition from the emitters to the media bed.

While various embodiments have been described above, it should be understood that they have been presented by way of example only, and not limitation. While the embodiments have been particularly shown and described, it will be understood that various changes in form and details may be made. Where schematics and/or embodiments described above indicate certain components arranged in certain orientations or positions, the arrangement of components may be modified. Although various embodiments have been described as having particular features and/or combinations of components, other embodiments are possible having a combination of any features and/or components from any of embodiments as discussed above.

The invention claimed is:

1. A method of regenerating a liquid desiccant with a desorber, the desorber including a housing defining an interior volume, and a distributor component including a conduit and an array of emitters disposed along the conduit, the method comprising:

directing a gas at a first mass flow rate having a predetermined temperature and humidity across a media bed disposed within the interior volume of the housing;

receiving the liquid desiccant at the conduit, the liquid desiccant including water and a salt at a first salt concentration by weight;

dispensing, through each emitter of the array of emitters, the liquid desiccant to the media bed at a second mass flow rate such that the liquid desiccant wets the media bed and water is transferred from the liquid desiccant to the gas; and after the dispensing, directing the liquid desiccant out of the housing via an outlet port, wherein the first mass flow rate is selected so that when the water is transferred to the gas with the liquid desiccant dispensed at the second mass flow rate, the liquid desiccant at the outlet port becomes regenerated and includes the salt at a second salt concentration by weight, the second salt concentration being larger than the first salt concentration.

2. The method of claim 1, wherein the predetermined temperature is at least about 65° F. and the predetermined humidity is no more than about 0.012 kg of water content per kg of gas.

3. The method of claim 1, wherein the predetermined temperature is at least about 85° F. and the predetermined humidity is no more than about 0.025 kg of water content per kg of gas.

4. The method of claim 1, wherein the second salt concentration is at least 1% greater than the first salt concentration.

5. The method of claim 1, wherein a temperature and a water vapor pressure of the liquid desiccant at the outlet port approaches equilibrium with the gas entering the desorber.

6. The method of claim 1, wherein a temperature and a water vapor pressure of the liquid desiccant at the outlet port approaches within 5 degrees Fahrenheit and 0.25 psi water vapor pressure of the gas entering the desorber.

7. The method of claim 1, wherein the desorber is configured to be operably incorporated into a liquid desiccant system including an absorber; and an amount of heat transported by the liquid desiccant to a process air stream in the absorber after exiting the housing via the outlet port is minimized by minimizing the second mass flow rate.

8. The method of claim 7, wherein the amount of heat transported by the liquid desiccant to the process airstream is no more than at least one of 2 kW or 2% of a cooling capacity of the liquid desiccant system.

9. The method of claim 8, wherein an amount of heat required to regenerate the liquid desiccant in the desorber is minimized by minimizing the second mass flow rate.

10. The method of claim 9, wherein the amount of heat required is no more than about 20 kW.

11. The method of claim 1, wherein the second mass flow rate is selected to maximize an effectiveness of the desorber.

12. The method of claim 1, wherein the second mass flow rate is selected to be a predetermined value that is high enough to prevent sputtering and low enough to prevent jetting thereby preventing carryover of the liquid desiccant into the gas.

13. The method of claim 1, wherein the desorber is configured to be operably incorporated into a liquid desiccant system, the liquid desiccant transfers heat to a supply airflow of the liquid desiccant system after exiting the housing via the outlet port, and the second mass flow rate is selected such that the heat transferred to the supply airflow reduces the efficiency of the system by no more than about 1%.

14. The method of claim 1, wherein the first mass flow rate is at least about 20 times the second mass flow rate.

15. The method of claim 1, wherein each emitter from the array of emitters includes:
- a casing defining an interior volume;
- an inlet orifice disposed on the casing and configured to fluidically couple the conduit to the interior volume; and
- an outlet orifice disposed on the casing and configured to dispense the liquid desiccant to the media bed at the second mass flow rate,
- wherein a pressure drop between the inlet orifice and the outlet orifice of each emitter from the array of emitters being at least equal to a pressure drop across the conduit.

16. The method of claim 15, wherein a density of the array of emitters is selected to maximize the effectiveness of the media bed.

17. The method of claim 16, wherein the density of the array of emitters is greater than about 1 emitter per square foot.

18. The method of claim 15, wherein the pressure drop between the inlet orifice and the outlet orifice of each emitter from the array of emitters is at least three times a pressure drop across the conduit.

19. The method of claim 15, wherein the pressure drop between the inlet orifice and the outlet orifice of each emitter from the array of emitters is at least about 1 psi.

20. A method of regenerating a liquid desiccant with a desorber, the desorber including a housing defining an interior volume, and a distributor component including a conduit and an array of emitters disposed along the conduit, the array of emitters disposed along the conduit and having a density greater than about 1 emitter per square foot, the method comprising:
- directing a gas at a first mass flow rate having a predetermined temperature and humidity across a media bed disposed within the interior volume of the housing;
- receiving the liquid desiccant at the conduit at a first concentration by weight;
- dispensing, through each emitter of the array of emitters, the liquid desiccant to the media bed at a second mass flow rate such that the liquid desiccant wets the media bed and water is transferred from the liquid desiccant to the gas; and
- after the dispensing, directing the liquid desiccant out of the housing via an outlet port,
- wherein the first mass flow rate is selected so that when the water is transferred to the gas with the liquid desiccant dispensed at the second mass flow rate, the liquid desiccant at the outlet port becomes regenerated and includes the salt at a second salt concentration by weight, the second salt concentration being larger than the first salt concentration.

21. The method of claim 20, wherein the predetermined temperature is at least about 65° F. and the predetermined humidity is no more than about 0.012 kg of water content per kg of gas.

22. The method of claim 20, wherein the second salt concentration is at least 1% greater than the first salt concentration.

23. The method of claim 20, wherein the first mass flow rate is at least about 20 times the second mass flow rate.

24. A method of regenerating a liquid desiccant with a desorber, the desorber including a housing defining an interior volume, and a distributor component including a conduit and an array of emitters disposed along the conduit, the method comprising:
- directing a gas at a first mass flow rate having a predetermined temperature and humidity across a media bed disposed within the interior volume of the housing;
- receiving the liquid desiccant at the conduit, the liquid desiccant including water and a salt at a first salt concentration by weight;
- dispensing, through each emitter of the array of emitters, the liquid desiccant to the media bed at a second mass flow rate such that the liquid desiccant wets the media bed and water is transferred from the liquid desiccant to the gas; and
- after the dispensing, directing the liquid desiccant out of the housing via an outlet port,
- wherein (a) the first mass flow rate is selected so that when the water is transferred to the gas with the liquid desiccant dispensed at the second mass flow rate, the liquid desiccant at the outlet port becomes regenerated and includes the salt at a second salt concentration by weight, the second salt concentration being larger than the first salt concentration, and (b), the first mass flow rate is at least 20 times the second mass flow rate.

25. The method of claim 24, wherein the predetermined temperature is at least about 85° F. and the predetermined humidity is no more than about 0.025 kg of water content per kg of gas.

26. The method of claim 24, wherein each emitter from the array of emitters includes:
- a casing defining an interior volume;

an inlet orifice disposed on the casing and configured to fluidically couple the conduit to the interior volume; and
- an outlet orifice disposed on the casing and configured to dispense the liquid desiccant to the media bed at the second mass flow rate,
- wherein a pressure drop between the inlet orifice and the outlet orifice of each emitter from the array of emitters being at least equal to a pressure drop across the conduit.

27. The method of claim 26, wherein the pressure drop between the inlet orifice and the outlet orifice of each emitter from the array of emitters is at least three times a pressure drop across the conduit.

28. A method of regenerating a liquid desiccant with a desorber, the desorber including a housing defining an interior volume, and a distributor component including a conduit and an array of emitters disposed along the conduit, the distributor component directly coupled to an outlet port of an absorber, the method comprising:
- directing a gas at a first mass flow rate having a predetermined temperature and humidity across a media bed disposed within the interior volume of the housing;
- receiving, via the outlet port of the absorber, the liquid desiccant at the conduit, the liquid desiccant including water and a salt at a first salt concentration by weight;
- dispensing, through each emitter of the array of emitters, the liquid desiccant to the media bed at a second mass flow rate such that the liquid desiccant wets the media bed and water is transferred from the liquid desiccant to the gas; and
- after the dispensing, directing the liquid desiccant out of the housing via an outlet port,
- wherein the first mass flow rate is selected so that when the water is transferred to the gas with the liquid desiccant dispensed at the second mass flow rate, the liquid desiccant at the outlet port becomes regenerated and includes the salt at a second salt concentration by weight, the second salt concentration being larger than the first salt concentration.

29. The method of claim 28, wherein each emitter from the array of emitters includes:

a casing defining an interior volume;

an inlet orifice disposed on the casing and configured to fluidically couple the conduit to the interior volume; and an outlet orifice disposed on the casing and configured to dispense the liquid desiccant to the media bed at the second mass flow rate, wherein a pressure drop between the inlet orifice and the outlet orifice of each emitter from the array of emitters being at least equal to a pressure drop across the conduit.

30. The method of claim 28, wherein the conduit of the distributor component is disposed within the desorber according to a pattern including at least one of an s-shaped pattern, a spiral pattern, a wave-like pattern, or a concentric circles pattern.

31. The method of claim 28, wherein the receiving includes receiving the liquid desiccant at the conduit from the absorber without entering any storage tank after exiting the absorber.

* * * * *